(12) United States Patent
Salm et al.

(10) Patent No.: US 12,636,741 B2
(45) Date of Patent: May 26, 2026

(54) BRAZE REPAIR USING METAL COUPON WITH POROUS REGION

(71) Applicant: GE Infrastructure Technology LLC, Greenville, SC (US)

(72) Inventors: Jacob Andrew Salm, Simpsonville, SC (US); Mark Lawrence Hunt, Greenville, SC (US); Nathan Nicholas Ostrout, Greenville, SC (US); James Warren Pemrick, Troy, NY (US); Stanley Frank Simpson, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 132 days.

(21) Appl. No.: 18/495,812

(22) Filed: Oct. 27, 2023

(65) Prior Publication Data

US 2025/0135588 A1     May 1, 2025

(51) Int. Cl.
B23K 1/00 (2006.01)
B23P 6/00 (2006.01)
(Continued)

(52) U.S. Cl.
CPC ............ B23P 6/005 (2013.01); B23K 1/0018 (2013.01); B23K 2101/001 (2018.08); B33Y 80/00 (2014.12)

(58) Field of Classification Search
CPC ............ B23K 1/0008; B23K 2101/001; B23K 1/0018; B22F 10/36; B22F 10/38;
(Continued)

(56) References Cited

U.S. PATENT DOCUMENTS 653,280 A      7/1900   Barthels et al.
3,031,996 A    5/1962   Botvin
(Continued)

FOREIGN PATENT DOCUMENTS

CA        2731756 C   *   4/2016   ............. F01D 5/005
CN     101626862 A   *   1/2010   ............... B23K 3/06
(Continued)

OTHER PUBLICATIONS

Translation of EP-2450471A1 (no date available).*
(Continued)

*Primary Examiner* — Kiley S Stoner
(74) *Attorney, Agent, or Firm* — James Pemrick; Charlotte Wilson; Hoffman Warnick LLC

(57) ABSTRACT

A component includes a body having a coupon opening defined therein, and an additively manufactured (AM) metal coupon including a dense region, a porous region adjacent the dense region, and a coupon outer surface. The porous region has a first cross-sectional area at a first location at or near the coupon outer surface and a second cross-sectional area less than the first cross-sectional area at a second location distal from the coupon outer surface. A braze material couples the metal coupon in the coupon opening and infiltrates into the porous region, e.g., based at least on a characteristic of the porosity thereof. The dense region may have a third cross-sectional area at the first location and a fourth cross-sectional area greater than the third cross-sectional area at the second location so it can direct the braze material in the porous region toward an inner surface of the coupon opening.

21 Claims, 26 Drawing Sheets

(51) Int. Cl.
    *B23K 101/00*     (2006.01)
    *B33Y 80/00*     (2015.01)

(58) Field of Classification Search
    CPC .. B22F 2007/068; B22F 2999/00; B22F 5/04;
          B22F 7/062; B22F 10/28; B22F 3/11;
          B22F 7/002; B22F 7/02; B22F 7/06;
          B22F 10/20; B33Y 10/00; B33Y 50/02;
          B33Y 80/00; B33Y 70/00; Y02P 10/25;
          B23P 6/005; B23P 6/002; F01D 5/005;
          F05D 2230/13; F05D 2230/31; F05D
          2230/72; F05D 2230/80; F05D 2300/17
    USPC .................................. 228/56.3, 245–262, 119
    See application file for complete search history.

(56)              References Cited

U.S. PATENT DOCUMENTS

| | | | | |
|---|---|---|---|---|
| 4,195,764 | A | | 4/1980 | Bogart |
| 5,156,321 | A | * | 10/1992 | Liburdi ................... B23K 35/30 |
| | | | | 228/175 |
| 5,511,721 | A | * | 4/1996 | Demo ..................... B23K 31/02 |
| | | | | 228/119 |
| 5,775,402 | A | | 7/1998 | Sachs et al. |
| 6,199,746 | B1 | | 3/2001 | Dupree et al. |
| 6,413,650 | B1 | | 7/2002 | Dupree et al. |
| 7,635,078 | B2 | | 12/2009 | Ariga et al. |
| 8,042,723 | B2 | * | 10/2011 | Holi ........................ B23P 6/002 |
| | | | | 228/159 |
| 9,873,171 | B2 | | 1/2018 | Li et al. |
| 10,006,293 | B1 | * | 6/2018 | Jones ................. B23K 15/0086 |
| 10,228,138 | B2 | | 3/2019 | Theuer et al. |
| 10,384,787 | B2 | | 8/2019 | Gordon et al. |
| 10,456,849 | B2 | | 10/2019 | Eminoglu |
| 10,767,489 | B2 | * | 9/2020 | Bunker ................... F01D 5/186 |
| 10,975,719 | B2 | | 4/2021 | Ucok et al. |
| 11,001,002 | B2 | | 5/2021 | Kulinsky |
| 11,577,317 | B2 | * | 2/2023 | Hart ....................... B33Y 10/00 |
| 11,712,738 | B2 | | 8/2023 | Ozbaysal et al. |
| 2004/0134887 | A1 | * | 7/2004 | Murphy .................. B23P 6/005 |
| | | | | 219/76.14 |
| 2007/0084047 | A1 | * | 4/2007 | Lange ..................... F01D 5/005 |
| | | | | 29/889.1 |
| 2009/0229101 | A1 | * | 9/2009 | Ahmad ................... F01D 5/005 |
| | | | | 29/402.18 |
| 2010/0239412 | A1 | | 9/2010 | Draper |
| 2011/0099810 | A1 | | 5/2011 | Stankowski et al. |
| 2011/0180589 | A1 | * | 7/2011 | Tuppen ..................... F01D 5/00 |
| | | | | 228/119 |
| 2012/0003086 | A1 | | 1/2012 | Morris et al. |
| 2013/0086785 | A1 | | 4/2013 | Cui et al. |
| 2013/0104397 | A1 | | 5/2013 | Bunker |
| 2013/0108460 | A1 | * | 5/2013 | Szwedowicz ............ C22F 1/10 |
| | | | | 164/48 |
| 2013/0115091 | A1 | | 5/2013 | Bruck |
| 2014/0020823 | A1 | | 1/2014 | Montross |
| 2014/0072448 | A1 | * | 3/2014 | Prue ........................ F01D 5/20 |
| | | | | 29/889.71 |
| 2014/0111956 | A1 | | 4/2014 | Taniguchi |
| 2014/0259666 | A1 | | 9/2014 | Baughman et al. |
| 2014/0321994 | A1 | * | 10/2014 | Brzek ..................... F01D 5/183 |
| | | | | 415/175 |
| 2014/0329043 | A1 | * | 11/2014 | Shigetomi ................ B23P 6/00 |
| | | | | 29/402.09 |
| 2015/0093566 | A1 | | 4/2015 | Bell |
| 2015/0111060 | A1 | | 4/2015 | Kottilingam |
| 2015/0147164 | A1 | | 5/2015 | Cui et al. |
| 2015/0283642 | A1 | * | 10/2015 | Forsdike ................ B23K 20/16 |
| | | | | 228/248.1 |
| 2016/0059364 | A1 | * | 3/2016 | Huxol .................... F01D 5/147 |
| | | | | 228/119 |
| 2016/0090848 | A1 | * | 3/2016 | Engeli .................... B33Y 80/00 |
| | | | | 219/76.12 |
| 2016/0115571 | A1 | | 4/2016 | Kestler et al. |

| | | | | |
|---|---|---|---|---|
| 2016/0214176 | A1 | | 7/2016 | Bruck et al. |
| 2016/0325368 | A1 | | 11/2016 | Landwehr et al. |
| 2017/0029088 | A1 | * | 2/2017 | Gruner ..................... B32B 27/18 |
| 2017/0108216 | A1 | * | 4/2017 | Taniguchi ................ F23R 3/42 |
| 2017/0284206 | A1 | | 10/2017 | Roberts |
| 2017/0328207 | A1 | | 11/2017 | Bunker |
| 2018/0010457 | A1 | | 1/2018 | Chabane et al. |
| 2018/0010458 | A1 | * | 1/2018 | Chabane ............... B33Y 80/00 |
| 2018/0023403 | A1 | | 1/2018 | Jones et al. |
| 2018/0161902 | A1 | | 6/2018 | Cui et al. |
| 2018/0180329 | A9 | | 6/2018 | Conrad et al. |
| 2018/0187564 | A1 | * | 7/2018 | Cui ........................ B23K 35/30 |
| 2018/0200817 | A1 | | 7/2018 | Henderson et al. |
| 2018/0320270 | A1 | | 11/2018 | Nardi |
| 2018/0339354 | A1 | | 11/2018 | Eminoglu et al. |
| 2018/0345415 | A1 | * | 12/2018 | Whims ................. B23K 1/206 |
| 2019/0054567 | A1 | | 2/2019 | Roerig et al. |
| 2019/0284942 | A1 | * | 9/2019 | Tanigawa .................. C23C 4/02 |
| 2019/0329344 | A1 | | 10/2019 | Eminoglu et al. |
| 2019/0345826 | A1 | | 11/2019 | Packer et al. |
| 2020/0047253 | A1 | | 2/2020 | Thomas et al. |
| 2020/0072078 | A1 | * | 3/2020 | Decesare ................ F23R 3/007 |
| 2020/0149403 | A1 | | 5/2020 | Kottilingam et al. |
| 2020/0254547 | A1 | * | 8/2020 | Puidokas ............... B22F 5/009 |
| 2020/0254548 | A1 | * | 8/2020 | Xu ..................... B23K 35/3033 |
| 2020/0384560 | A1 | * | 12/2020 | Rebbecchi, Jr. ......... B23K 1/20 |
| 2021/0114110 | A1 | | 4/2021 | Sercombe et al. |
| 2021/0146459 | A1 | | 5/2021 | Gold et al. |
| 2021/0146485 | A1 | | 5/2021 | Bulgrin et al. |
| 2021/0154956 | A1 | * | 5/2021 | Schubel ............... C22C 1/0433 |
| 2021/0246534 | A1 | * | 8/2021 | Cui ........................ B33Y 70/00 |
| 2022/0136395 | A1 | * | 5/2022 | Ozbaysal ............... B23P 6/002 |
| | | | | 29/889.1 |
| 2022/0234101 | A1 | * | 7/2022 | Ozbaysal ............... B22F 10/18 |
| 2022/0333494 | A1 | * | 10/2022 | Subramanian ........... C23C 4/11 |
| 2022/0347928 | A1 | * | 11/2022 | Truxel ................. B29C 44/0461 |
| 2022/0402031 | A1 | | 12/2022 | Hann et al. |
| 2023/0145370 | A1 | | 5/2023 | Dyson |
| 2024/0082919 | A1 | * | 3/2024 | Daulton ................. B22F 10/64 |
| 2024/0082938 | A1 | * | 3/2024 | Daulton ................. B33Y 40/10 |
| 2024/0082939 | A1 | * | 3/2024 | Daulton ................. B23K 35/0244 |
| 2025/0135533 | A1 | * | 5/2025 | Salm ........................ B22F 5/04 |
| 2025/0135545 | A1 | * | 5/2025 | Pemrick ................. B33Y 10/00 |
| 2025/0135566 | A1 | * | 5/2025 | Simpson ................. B23P 6/005 |
| 2025/0135567 | A1 | * | 5/2025 | Simpson ................. F01D 5/005 |
| 2025/0135588 | A1 | * | 5/2025 | Salm ..................... B33Y 10/00 |
| 2025/0135749 | A1 | * | 5/2025 | Simpson ................. B33Y 80/00 |
| 2025/0135751 | A1 | * | 5/2025 | Macmillan ............. B33Y 10/00 |
| 2025/0137373 | A1 | * | 5/2025 | Dozier ..................... B22F 7/06 |
| 2025/0137387 | A1 | * | 5/2025 | Hunt ........................ F01D 5/18 |

FOREIGN PATENT DOCUMENTS

| | | | | | |
|---|---|---|---|---|---|
| CN | 108393648 | A | * | 8/2018 | ............. B23K 37/06 |
| CN | 113430414 | A | | 9/2021 | |
| CN | 116532909 | A | * | 8/2023 | ............... B23P 6/04 |
| CN | 119489203 | A | * | 2/2025 | ............. B33Y 10/00 |
| CN | 119604401 | A | * | 3/2025 | ........ C04B 35/62892 |
| CN | 119897464 | A | * | 4/2025 | ............. B33Y 80/00 |
| CN | 119897467 | A | * | 4/2025 | ............. B33Y 80/00 |
| CN | 119897480 | A | * | 4/2025 | ............. B33Y 10/00 |
| CN | 119897481 | A | * | 4/2025 | ............. B33Y 10/00 |
| DE | 102014224410 | A1 | * | 6/2016 | ............. F01D 5/005 |
| DE | 10 2018 218017 | A1 | | 4/2020 | |
| EP | 1074331 | A1 | | 2/2001 | |
| EP | 1127648 | A2 | * | 8/2001 | ............. B23P 6/005 |
| EP | 2078579 | A1 | | 7/2009 | |
| EP | 2450471 | A1 | | 5/2012 | |
| EP | 3360637 | A1 | | 8/2018 | |
| EP | 3508686 | A1 | | 7/2019 | |
| EP | 3693115 | A1 | | 8/2020 | |
| EP | 4545208 | A2 | * | 4/2025 | |
| EP | 4545209 | A1 | * | 4/2025 | |
| EP | 4545212 | A1 | * | 4/2025 | |
| EP | 4545218 | A1 | * | 4/2025 | |
| JP | 2022542180 | A | * | 9/2022 | ............. B22F 10/16 |
| TW | I670166 | B | | 9/2019 | |

(56)                  References Cited

FOREIGN PATENT DOCUMENTS

| WO | 2020014677 | A1 | 1/2020 |
| WO | 2020145971 | A1 | 7/2020 |
| WO | 2021247970 | A1 | 12/2021 |

OTHER PUBLICATIONS

Non-Final Office Action dated May 9, 2025 for related U.S. Appl. No. 18/495,808, 16 pages.

Office Action (Non-Final Rejection) dated Jul. 28, 2025 for related U.S. Appl. No. 18/417,625, 16 pages.

Office Action (Final Rejection) dated Aug. 8, 2025 for related U.S. Appl. No. 18/495,816, 15 pages.

Notice of Allowance and Fees Due dated Aug. 5, 2025 for related U.S. Appl. No. 18/495,817, 9 pages.

Office Action (Non-Final Rejection) dated Aug. 11, 2025 for related U.S. Appl. No. 18/495,809, 13 pages.

Office Action (Non-Final Rejection) dated Aug. 12, 2025 for related U.S. Appl. No. 18/495,810, 14 pages.

EP Search Report for EP Application No. 24223562.0, dated Jul. 8, 2025, 7 pages.

EP Search Report for EP Application No. 24204162.2, dated Mar. 14, 2025, 11 pages.

Final Office Action for related U.S. Appl. No. 18/495,803, dated Mar. 19, 2025, 26 pages.

Non-Final Office Action issued in U.S. Appl. No. 18/495,803, dated Nov. 14, 2024, 26 pages.

Office Action (Non-Final Rejection) dated Sep. 4, 2025 for U.S. Appl. No. 18/495,818 (pp. 1-13).

Office Action (Final Rejection) dated Sep. 26, 2025 for related U.S. Appl. No. 18/495,808, 17 pages.

Non-Final Office Action dated Apr. 21, 2025 for related U.S. Appl. No. 18/495,816, 29 pages.

EP Search Report for EP Application No. 24204157.2, dated Mar. 14, 2025, 11 pages.

EP Search Report for EP Application No. 24204160.6, dated Apr. 16, 2025, 12 pages.

EP Search Report for EP Application No. 24204462.6, dated Apr. 1, 2025, 10 pages.

EP Search Report for EP Application No. 24204155.6, dated Apr. 2, 2025, 10 pages.

EP Search Report for EP Application No. 24204158.0, dated Mar. 19, 2025, 10 pages.

EP Search Report for EP Application No. 24204153.1, dated Mar. 3, 2025, 11 pages.

EP Search Report for EP Application No. 24204463.4, dated Apr. 22, 2025, 10 pages.

EP Search Report for EP Application No. 24204461.8, dated Mar. 14, 2025, 11 pages.

EP Search Report for EP Application No. 24204154.9, dated Mar. 19, 2025, 13 pages.

EP Search Report for EP Application No. 24204161.4, dated Mar. 14, 2025, 14 pages.

EP Search Report for EP Application No. 24204156.4, dated Mar. 18, 2025, 13 pages.

EP Search Report for EP Application No. 24223553.9, dated Nov. 17, 2025, 9 pages.

Glossary of Metallurgical and Metalworking Terms, ASM Handbook, 1998 (Year: 1998), pp. 1 and 52.

Notice of Allowance and Fees Due dated Dec. 9, 2025 for U.S. Appl. No. 18/417,625, 9 pages.

Notice of Allowance and Fees Due dated Dec. 22, 2025 for U.S. Appl. No. 18/495,807, 8 pages.

Office Action (Non-Final Rejection) dated Nov. 24, 2025 for U.S. Appl. No. 18/495,816, 22 pages.

Office Action (Non-Final Rejection) dated Dec. 17, 2025 for U.S. Appl. No. 18/495,804, 17 pages.

Notice of Allowance and Fees Due dated Dec. 31, 2025 for U.S. Appl. No. 18/495,810, 11 pages.

Office Action (Final Rejection) dated Dec. 31, 2025 for U.S. Appl. No. 18/495,809, 13 pages.

Notice of Allowance and Fees Due dated Jan. 21, 2026 for U.S. Appl. No. 18/495,808, 10 pages.

Office Action (Final Rejection) dated Feb. 2, 2026 for U.S. Appl. No. 18/495,818, 13 pages.

* cited by examiner

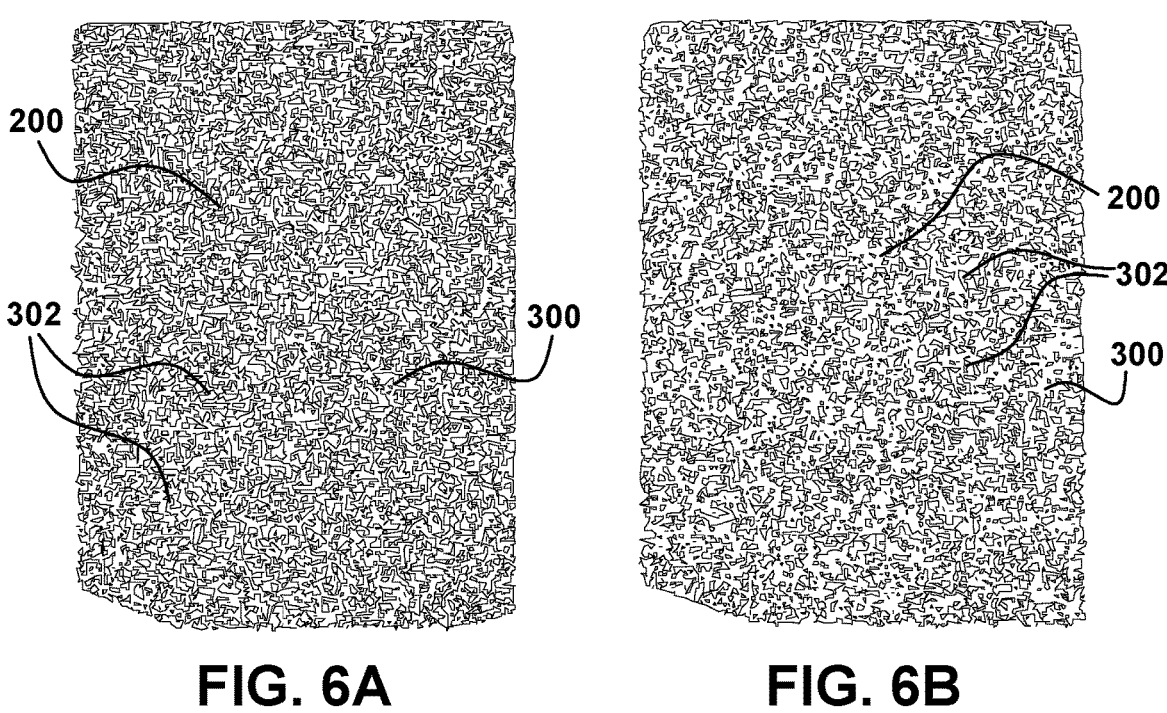
FIG. 6A                                    FIG. 6B
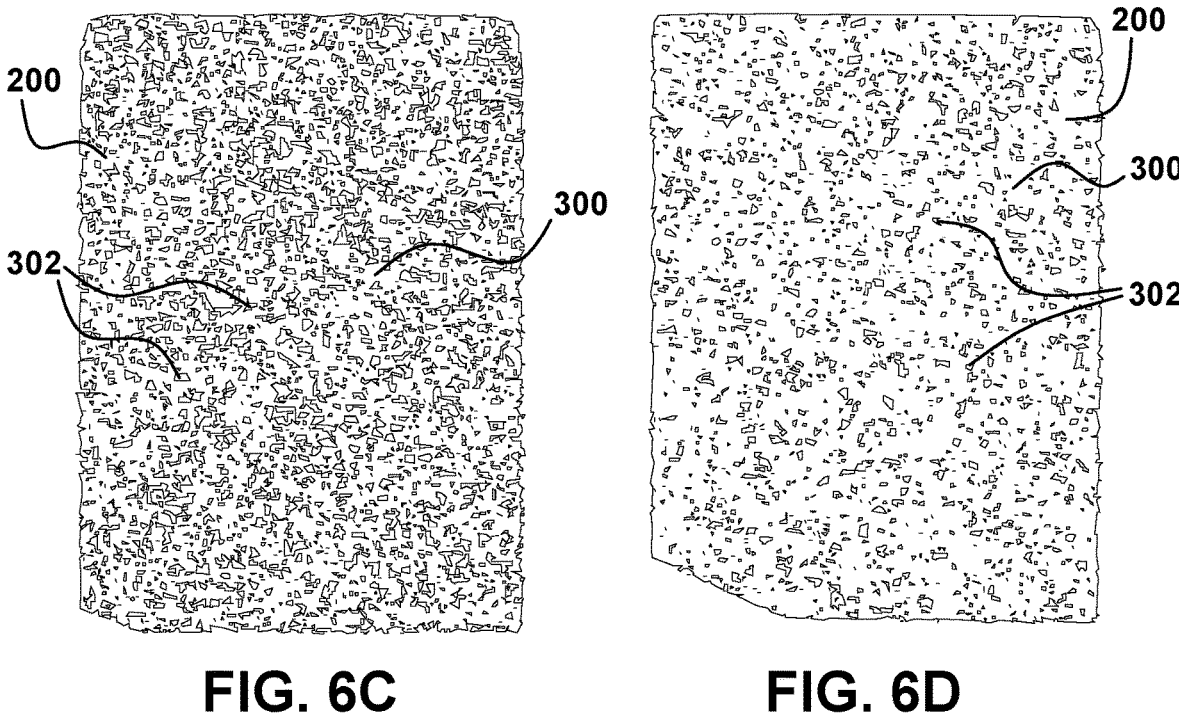
FIG. 6C                                    FIG. 6D

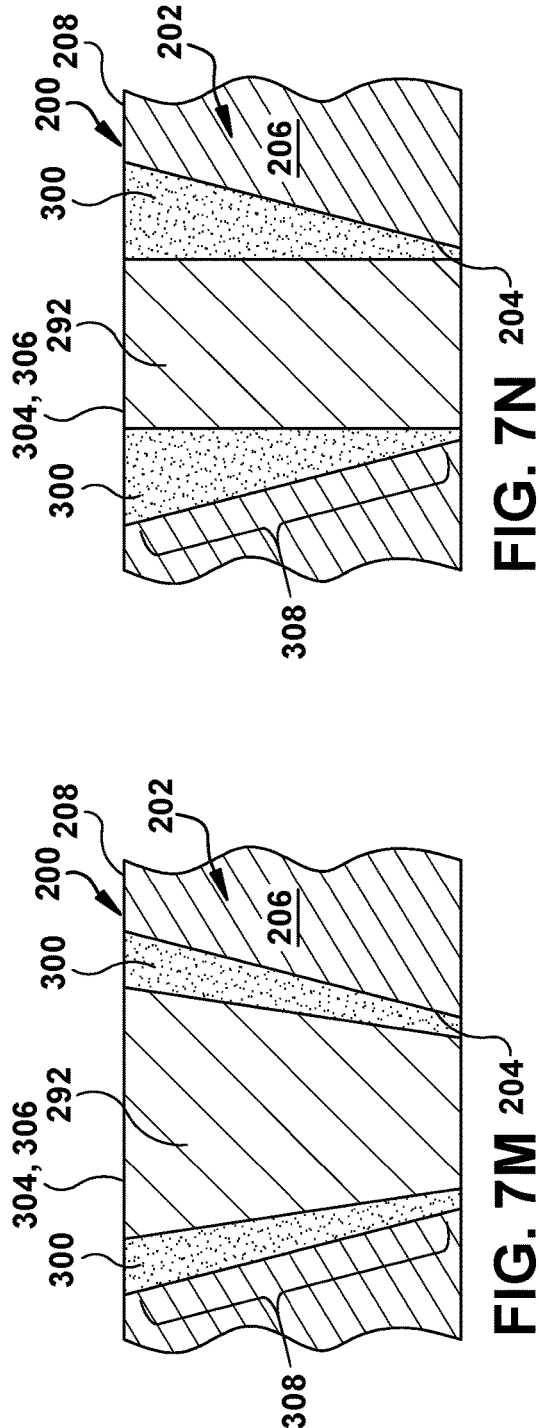
FIG. 7N
FIG. 7M
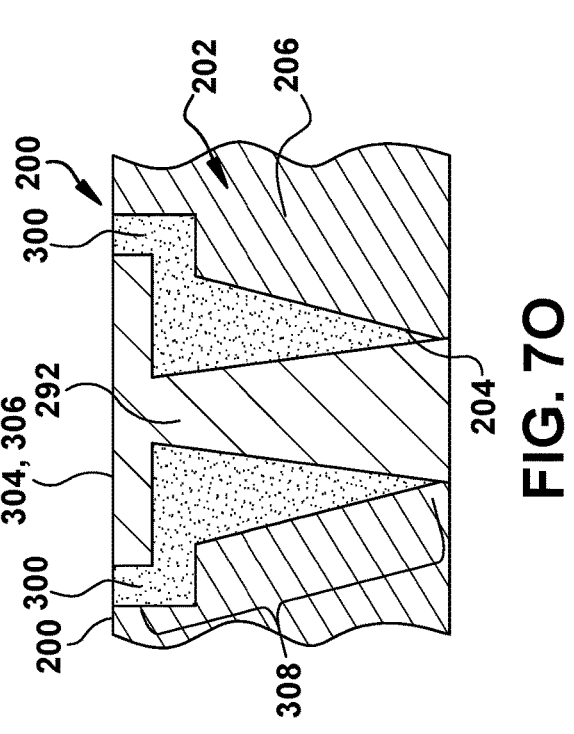
FIG. 7O

BRAZE REPAIR USING METAL COUPON WITH POROUS REGION

TECHNICAL FIELD

The disclosure relates generally to component repair, and more specifically, to component repair using a metal coupon with a porous region.

BACKGROUND

Industrial components occasionally require repair. For example, hot gas path components that are used in turbomachines to direct a working fluid to create energy may require repair. Hot gas path components can take a variety of forms, such as turbine rotating blades or stationary vanes, that include airfoils that direct a working fluid to create energy. Rotating blades are coupled to and act to turn a turbine rotor, and stationary vanes are coupled to a casing of the turbomachine to direct the working fluid towards the rotating blades.

Additive manufacturing, such as direct metal laser melting (DMLM) or selective laser melting (SLM), has emerged as a reliable manufacturing method for making industrial components. The advent of additive manufacturing techniques has also provided the ability to replace sections of components such as part of a leading or trailing edge of a turbomachine nozzle. For example, a portion of a leading edge of a turbomachine nozzle may be removed, leaving a cutout in the nozzle, and a new section (referred to herein as a "coupon") may be coupled in the cutout. The coupon is additively manufactured to have a shape that at least generally matches that of the cutout. The coupon can replace a section of a used turbomachine nozzle or be added as part of a new turbomachine nozzle.

However, replacement coupons are made with the same materials and exterior structure as the removed portion of the component. Consequently, the replacement coupons suffer from some of the same drawbacks as the original component and/or cutout with no improvement to general performance characteristics such as coupon strength, oxidation resistance, cycle fatigue, stress/strain resistance, ductility, wear resistance, thermal or electrical conductivity, and/ or decreased mass. A single braze material is used to couple the replacement coupon to the component, which prevents improving the general performance characteristics listed above and additional performance characteristics related to the joint, such as increasing joint adhesive bond strength and reliability, and decreasing required post-braze machining/ blending. Using coupons that are materially identical to the removed cutouts also does not allow reduction in the high material cost for the replacement coupons.

BRIEF DESCRIPTION

All aspects, examples and features mentioned below can be combined in any technically possible way.

An aspect of the disclosure provides a component, comprising a metal coupon for inserting in a coupon opening in a component, the metal coupon comprising: an additively manufactured (AM) metal member including a dense region, a porous region adjacent the dense region, and a coupon outer surface; wherein the porous region has a first cross-sectional area at a first location at or near the coupon outer surface and a second cross-sectional area less than the first cross-sectional area at a second location distal from the coupon outer surface.

Another aspect of the disclosure includes any of the preceding aspects, and the dense region has a third cross-sectional area at the first location and a fourth cross-sectional area greater than the third cross-sectional area at the second location.

Another aspect of the disclosure includes any of the preceding aspects, and the porous region has a porosity between 2% to 50% open space volume to total volume of the porous region.

An aspect of the disclosure includes a component, comprising: a body having a coupon opening defined therein; an additively manufactured (AM) metal coupon including a dense region, a porous region adjacent the dense region, and a coupon outer surface, wherein the porous region has a first cross-sectional area at a first location at or near the coupon outer surface and a second cross-sectional area less than the first cross-sectional area at a second location distal from the coupon outer surface; and a braze material coupling the AM metal coupon in the coupon opening defined in the body, the braze material infiltrated into the porous region.

Another aspect of the disclosure includes any of the preceding aspects, and the dense region has a third cross-sectional area at the first location and a fourth cross-sectional area greater than the third cross-sectional area at the second location.

Another aspect of the disclosure includes any of the preceding aspects, and the porous region has a porosity between 2% to 50% open space volume to total volume of the porous region.

Another aspect of the disclosure includes any of the preceding aspects, and the porous region has a variable porosity having a higher porosity at the first location and a lower porosity towards a bottom of the coupon opening, and wherein the porous region includes more braze material at the first location than at the second location.

Another aspect of the disclosure includes any of the preceding aspects, and the body is solid material.

Another aspect of the disclosure includes any of the preceding aspects, and the AM metal coupon has a near net shape of the coupon opening in the body of the component.

Another aspect of the disclosure includes any of the preceding aspects, and further comprising a defect coupon opening in the body adjacent the coupon opening, wherein the braze material infiltrates at least part of the defect coupon opening.

An aspect of the disclosure includes a method of repairing a component having a defect and a component surface, the method comprising: removing at least part of the defect at the component surface by forming a coupon opening in the component; additively manufacturing a metal coupon; positioning the additively manufactured (AM) metal coupon in the coupon opening, the AM metal coupon including a dense region, a porous region adjacent the dense region, and a coupon outer surface, wherein the porous region has a first cross-sectional area at a first location at or near the coupon outer surface and a second cross-sectional area less than the first cross-sectional area at a second location distal from the coupon outer surface; positioning a braze material at a junction of the coupon outer surface of the AM metal coupon and the component surface of the component; and infiltrating the braze material into the porous region to couple the AM metal coupon in the coupon opening in the component.

Another aspect of the disclosure includes any of the preceding aspects, and the additive manufacturing includes forming the dense region with a third cross-sectional area at the first location and a fourth cross-sectional area greater than the third cross-sectional area at the second location.

Another aspect of the disclosure includes any of the preceding aspects, and, during the infiltrating, the braze material is directed towards an inner surface of the coupon opening through the porous region by at least part of the dense region.

Another aspect of the disclosure includes any of the preceding aspects, and the porous region includes more braze material at the first location than at the second location.

Another aspect of the disclosure includes any of the preceding aspects, and the porous region has a variable porosity having a higher porosity at the first location and a lower porosity towards a bottom of the coupon opening, and wherein the porous region includes more braze material at the first location than at the second location.

Another aspect of the disclosure includes any of the preceding aspects, and the infiltrating includes infiltrating all of the braze material positioned at the junction into the porous region.

Another aspect of the disclosure includes any of the preceding aspects, and the component and the AM metal coupon include a superalloy material.

Another aspect of the disclosure includes any of the preceding aspects, and the forming includes forming the coupon opening in the component at the defect and the component surface such that the coupon opening is disposed on either side of the defect.

Another aspect of the disclosure includes any of the preceding aspects, and the removing includes leaving a remaining portion of the defect and the infiltrating includes infiltrating the braze material into at least part of the remaining portion of the defect.

Another aspect of the disclosure includes any of the preceding aspects, and the coupon opening defines a first width, and the defect defines a second width, wherein the first width is larger than the second width.

Another aspect of the disclosure includes any of the preceding aspects, and further comprising, after forming the coupon opening: creating a model of the coupon opening; and additively manufacturing the AM metal coupon based on the model of the coupon opening.

Another aspect of the disclosure includes any of the preceding aspects, and the additive manufacturing includes manufacturing the metal coupon to a near net shape of the coupon opening based on the model of the coupon opening.

Another aspect of the disclosure includes any of the preceding aspects, and the metal coupon is additively manufactured by using a laser having one or more melting beams to fuse together layers of the metal powder, and further comprising adjusting a parameter of the laser to control the porosity of the porous region.

Another aspect of the disclosure includes any of the preceding aspects, and the adjusting a parameter step comprises at least one of: adjusting an amount of overlap of a melting area of the one or more melting beams; adjusting scanning speed; and adjusting at least one of melting beam spot size, focus, or power.

Two or more aspects described in this disclosure, including those described in this summary section, may be combined to form implementations not specifically described herein. That is, all embodiments described herein can be combined with each other.

The details of one or more implementations are set forth in the accompanying drawings and the description below.

Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 6A-D show top-down views of sample metal coupons having porous regions having different porosities according to embodiments of the disclosure;

Figure 1:
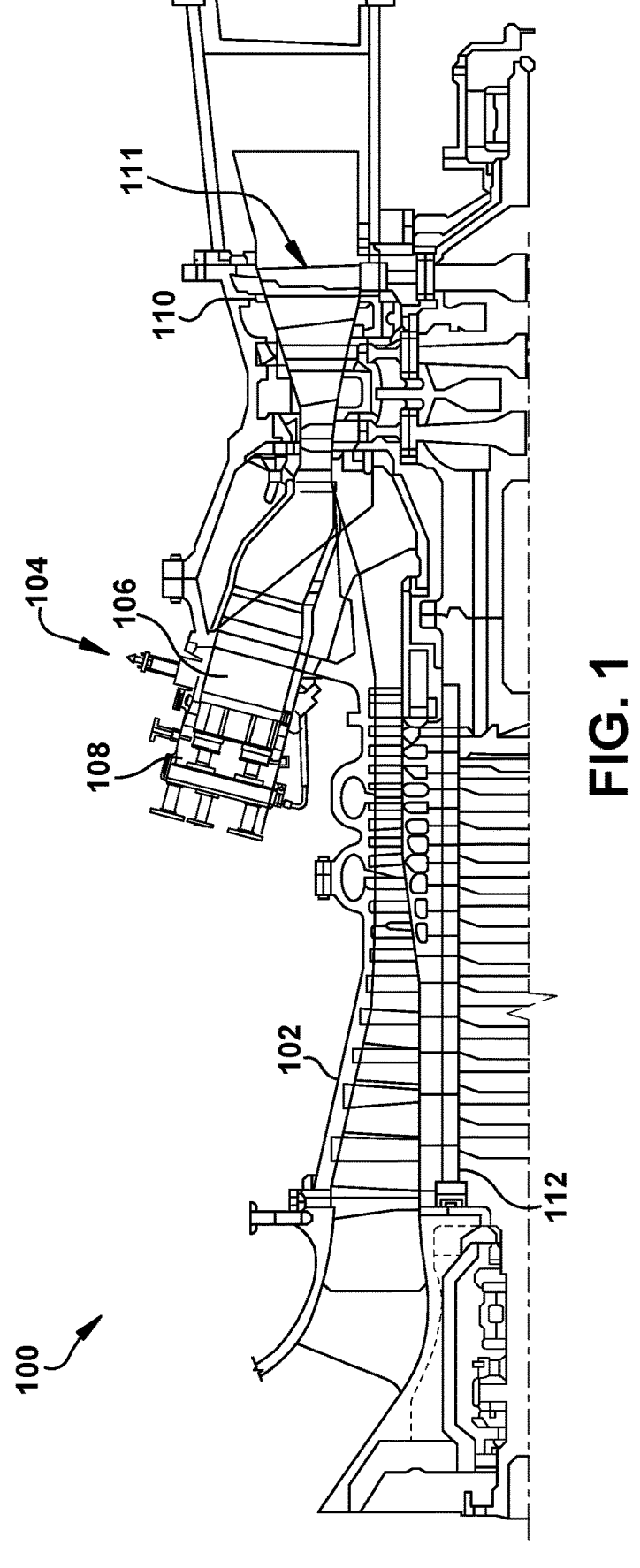
FIG. 1 shows a schematic view of an illustrative industrial machine in the form of a gas turbine system and including a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a component including a body having a coupon opening defined therein, and an additively manufactured (AM) metal coupon including a dense region, a porous region adjacent the dense region, and a coupon outer surface. A "coupon" as used herein may include any part configured to be positioned in a coupon opening in a body of the component as part of original manufacture or repair, i.e., it is an insertable part. The porous region has a first cross-sectional area at a first location at or near the coupon outer surface and a second cross-sectional area less than the first cross-sectional area at a second location distal from the coupon outer surface. A braze material couples the metal coupon in the coupon opening and infiltrates into the porous region, e.g., based at least on a characteristic of the porosity thereof. The dense region may have a third cross-sectional area at the first location and a fourth cross-sectional area greater than the third cross-sectional area at the second location. A method of coupling the metal coupon to the component may include additively manufacturing the metal coupon as noted and positioning the metal coupon in a coupon opening in a body of the component. The metal coupon may be infiltrated with a braze material to couple the metal coupon in the coupon opening in the body. The braze material infiltrates into the porous region based at least on a characteristic of the porosity thereof. The dense region can direct the braze material in the porous region toward, e.g., an inner surface of the coupon opening. The larger area of porosity at the coupon's outer surface acts as a reservoir to supply braze to the remainder of the joint. The porous and dense regions deliver the braze material to only the required areas instead of wetting the outside of the joint or wetting on the substrate of the component where braze material is not required, which minimizes the required subsequent machining to blend the surfaces. The porous region may also include one or more porosities configured to direct the flow of one or more braze materials in different ways to create different physical characteristics than previously possible, e.g., by directing more braze material where needed, directing braze material into special shapes and/or allowing use of more than one braze material. Where used for repair, the customized AM metal coupons do not suffer the same drawbacks as the original component and/or cutout and can be customized (with the braze material(s)) to, for example, change: joint adhesive bond strength, coupon strength, stress/strain resistance, ductility, wear resistance, oxidation resistance, cycle fatigue, thermal conductivity, electrical conductivity, surface roughness, hardness, and mass. The repair is stronger than traditional narrow gap brazing processes, does not require certain post-repair finishing, yet provides improved physical characteristics compared to current techniques, such as pre-sintered preforms (PSPs). One or more braze materials can be used to couple the replacement coupon to the component to also improve performance characteristics related to the joint, such as joint adhesive bond strength and reliability, and reducing required post-brazing machining/blending. Use of the porous AM coupon can also reduce material costs, for example, by using less of the metal coupon's more expensive base material.

FIG. 1 shows a schematic illustration of an illustrative industrial machine, which may include a component according to teachings of the disclosure. In the example, the machine includes a turbomachine 100 in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any industrial component that employs coupons during manufacture or repair.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors and fuel nozzle assemblies 108.

Figure 2:
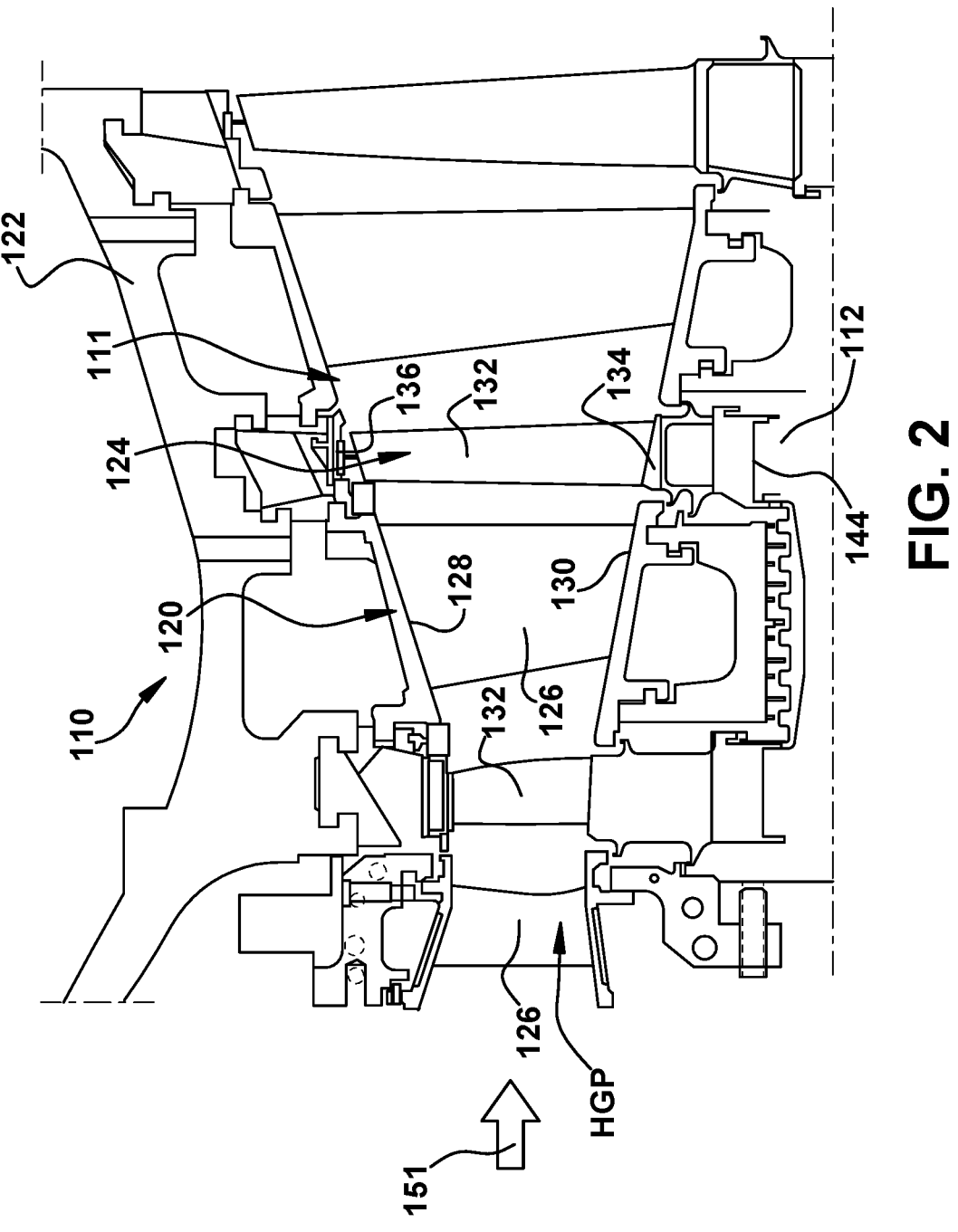
FIG. 2 shows a cross-sectional view of an illustrative gas turbine assembly that may be used with the gas turbine system in FIG. 1 and including a component according to embodiments of the disclosure.

FIG. 2 shows a cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row 124 of rotating blades 132. A stationary vane or nozzle 126 may be held in turbine assembly 110 by a radially outer platform 128 and a radially inner platform 130. Row 124 of blades in turbine assembly 110 includes rotating blades 132 coupled to rotor 112 and rotating with the rotor. Rotating blades 132 may include a radially inward platform 148 (at root of blade) coupled to rotor 112 and, optionally, a radially outward tip shroud 136 (at tip of blade). As used herein, the term "component" may refer collectively to stationary nozzles 126, rotating blades 132 or any other structure in which metal coupons including porous region(s) according to the disclosure can be employed.

Figure 3:
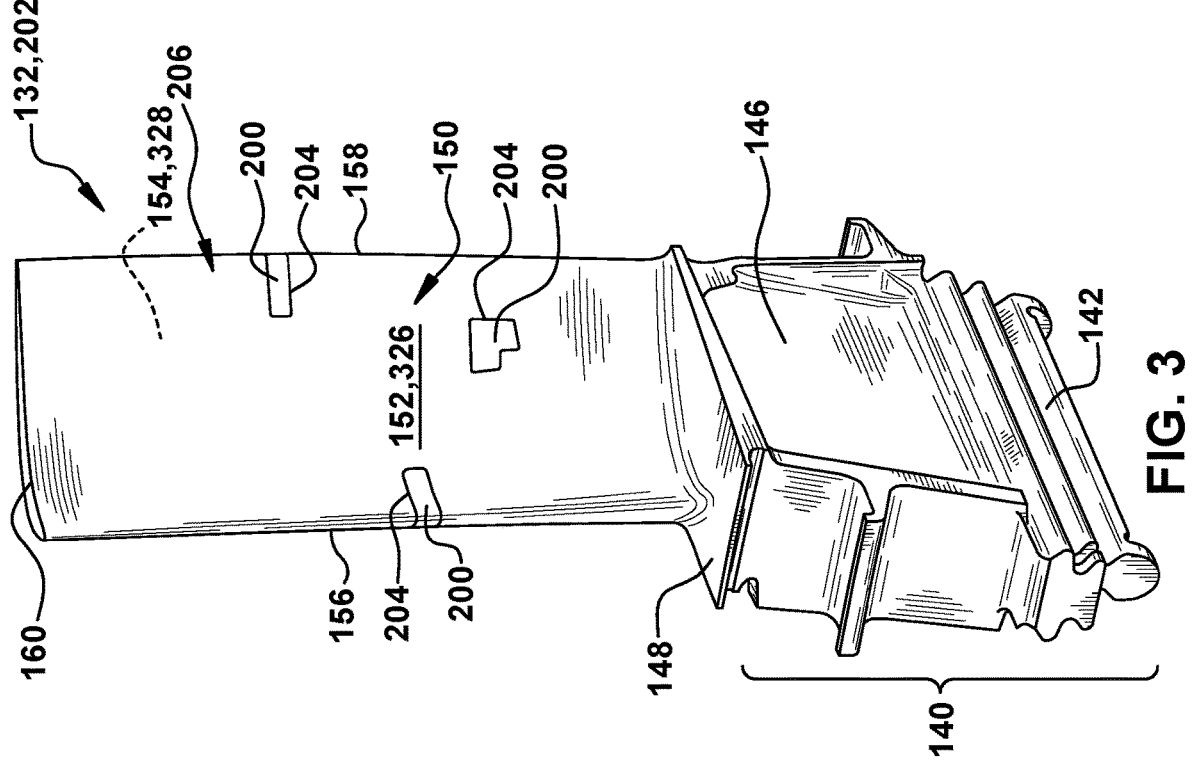
FIG. 3 shows a perspective view of a component in the form of a turbine rotating blade including a metal coupon according to embodiments of the disclosure.
Figure 4:
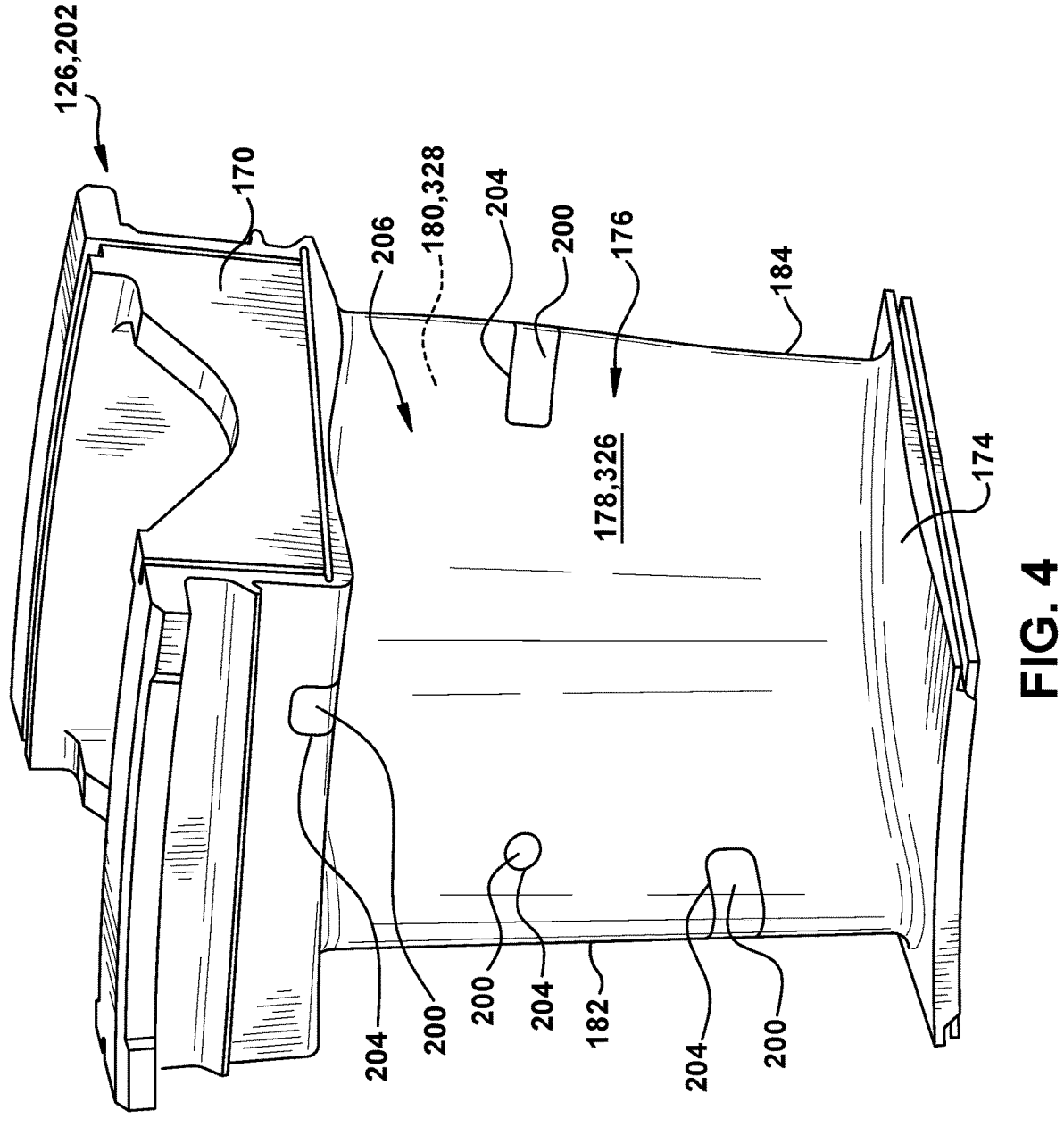
FIG. 4 shows a perspective view of a component in the form of a turbine nozzle including a metal coupon according to embodiments of the disclosure.

FIGS. 3 and 4 show illustrative components, such as hot gas path components of a turbomachine, in which teachings of the disclosure may be employed. FIG. 3 shows a perspective view of a turbine rotating blade 132 of the type in which embodiments of the present disclosure may be employed. Turbine rotating blade 132 includes a root 140 by which rotating blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of an airfoil 150 and root 140 and defines a portion of the inboard boundary of the flow path through turbine assembly 110. It will be appreciated that airfoil 150 is the active component of rotating blade 132 that intercepts the flow of working fluid 151 (FIG. 2), i.e., hot combustions gases, and induces the rotor disc to rotate. It will be seen that airfoil 150 of rotating blade 132 includes a concave pressure side (PS) outer wall 152 and a circumferentially or laterally opposite convex suction side (SS) outer wall 154 extending axially between opposite leading and trailing edges 156, 158 respectively. Side outer walls 152 and 154 also extend in the radial direction from platform 148 to an outboard tip 160, the latter of which may or may not include a tip shroud 136 (FIG. 2).

FIG. 4 shows a perspective view of a stationary nozzle 126 of the type in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between adjacent turbine rotor blade 132 (FIG. 3) platforms 148 (FIG. 3). Platform 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side outer walls 178 and 180 also extend in the radial direction from platform 170 to platform 174.

It is understood that blade 132 or nozzle 126 may include internal cooling structures including sources of coolant such as passages, conduits and other structure that deliver coolant to a surface thereof for film cooling. Coolant may include, for example, air from compressor 102.

As noted, embodiments of the disclosure described herein may include aspects applicable to either stationary nozzle 126, turbine rotating blade 132 and/or any other industrial component that employs coupons. FIGS. 3 and 4 also show illustrative additively manufactured (AM) metal coupons 200 (hereafter "metal coupons 200" or "AM metal coupons(s) 200" for brevity) in a component 202. More particularly, metal coupons 200 may be in a coupon opening 204 in a body 206 of component 202. A "coupon opening 204 in body 206" may be any size void in body 206 up to an including a removed section of body 206, e.g., tip shroud. For example, metal coupons 200 can be in coupon openings 204 in trailing edges 158, 184 of blade 132 or nozzle 126, respectively. Alternatively, metal coupons 200 can be in coupon openings 204 in leading edges 156, 182 of blade 132 or nozzle 126, respectively. Metal coupon 200 could also be in any tip (not shown) of blade 132 or platform 170 (shown in FIG. 4), 174 of nozzle 126. It is emphasized, however, that metal coupons 200 can be employed in any coupon opening 204 in a body 206 of component 202. Body 206 can be any part of, or all, of component 202. Component 202 includes a component surface 208.

Figure 5:
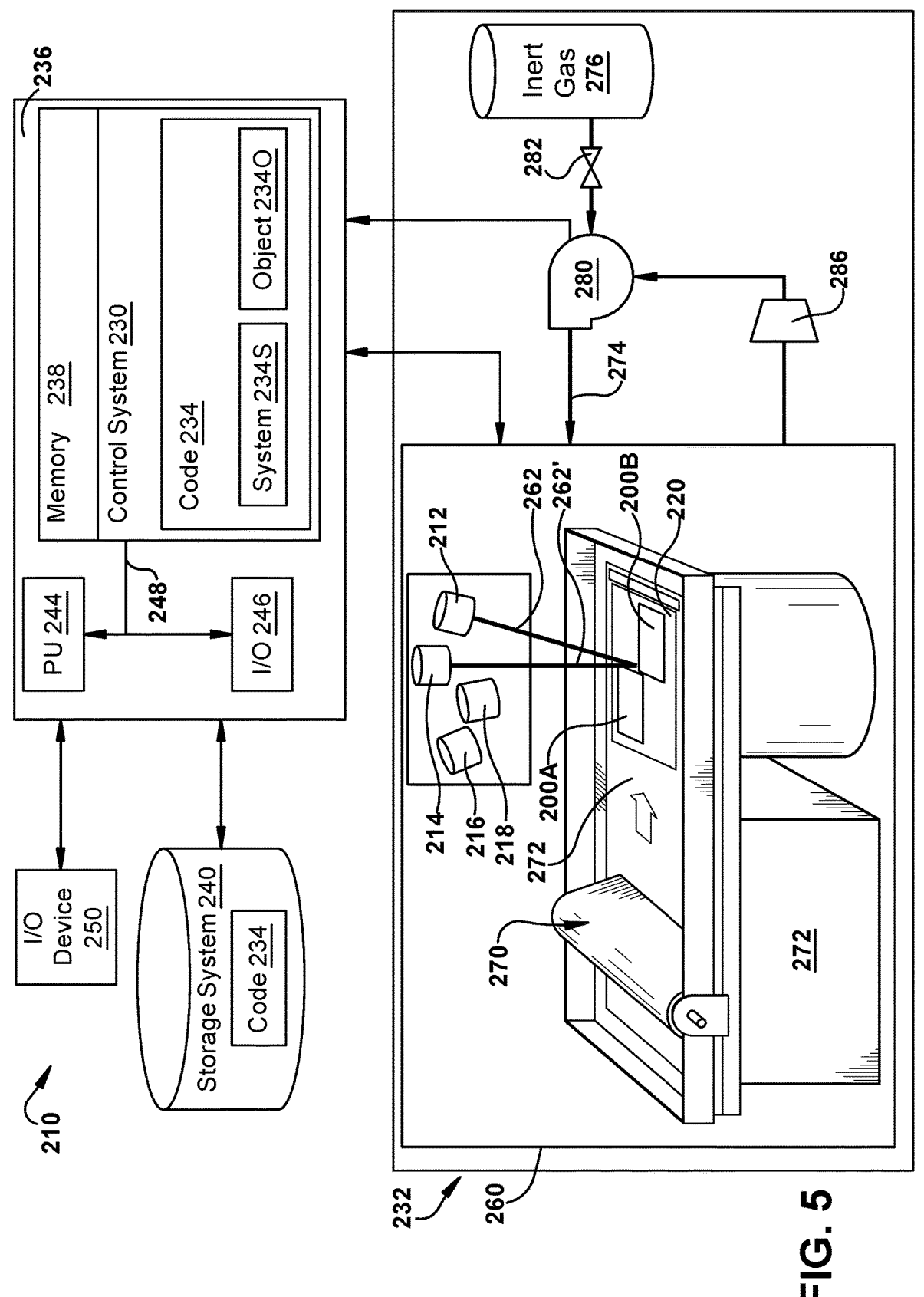
FIG. 5 shows a schematic block diagram of an illustrative additive manufacturing system for additively manufacturing a metal coupon according to embodiments of the disclosure.

Additively manufactured metal coupons 200 that include one or more porous regions therein may be additively manufactured using any now known or later developed technique capable of forming porous region(s). FIG. 5 shows a schematic/block view of an illustrative computerized metal powder additive manufacturing system 210 (hereinafter 'AM system 210') for generating metal coupon 200 or multiple metal coupons 200A, 200B (shown), of which only a single layer is shown. The teachings of the disclosures will be described relative to building metal coupon 200 using multiple melting beam sources 212, 214, 216, 218, but it is emphasized and will be readily recognized that the teachings of the disclosure are equally applicable to build multiple coupons 200A, 200B using any number of melting beam sources. In this example, AM system 210 is arranged for direct metal laser melting (DMLM). It is understood that the general teachings of the disclosure are equally applicable to other forms of metal powder additive manufacturing such as but not limited to powder bed fusion, direct metal laser sintering (DMLS), electron beam melting (EBM), selective laser sintering (SLS), selective laser melting (SLM), and perhaps other forms of additive manufacturing (i.e., other than metal powder applications). Coupons 200A, 200B are illustrated as rectangular elements; however, it is understood that the additive manufacturing process can be readily adapted to manufacture any shaped coupon, a large variety of different coupons, and a large number of coupons on build platform 220.

AM system 210 generally includes an additive manufacturing control system 230 ("control system") and an AM printer 232. As will be described, control system 230 executes set of computer-executable instructions or code 234 to generate coupon(s) 200 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.). Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate metal coupon(s) 200. Code 234 can include, among other things, a set of computer-executable instructions 234S (herein also referred to as 'code 234S') for operating AM printer 232, and a set of computer-executable instructions 2340 (herein also referred to as 'code 2340') defining metal coupon(s) 200 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

Set of computer-executable instructions 2340 defining metal coupon(s) 200 may include a precisely defined 3D model of a coupon and can be generated from any of a large variety of well-known computer aided design (CAD) software systems such as AutoCAD®, TurboCAD®, DesignCAD 3D Max, etc. In this regard, code 2340 can include any now known or later developed file format. Furthermore, code 2340 representative of metal coupon(s) 200 may be translated between different formats. For example, code 2340 may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 2340 representative of metal coupon(s) 200 may also be converted into a set of data signals and transmitted, received as a set of data signals and converted to code, stored, etc., as necessary. Code 2340 may be configured according to embodiments of the disclosure to allow for formation of border and internal sections in overlapping field regions, as will be described. In any event, code 2340 may be an input to AM system 210 and may come from a part designer, an intellectual property (IP) provider, a design company, the operator or owner of AM system 210, or from other sources. In any event, control system 230 executes code 234S and 2340, dividing metal coupon(s) 200 into a series of thin slices that assembles using AM printer 232 in successive layers of material.

AM printer 232 may include a processing chamber 260 that is sealed to provide a controlled atmosphere for metal coupon(s) 200 printing. A build platform 220, upon which metal coupon(s) 200 is/are built, is positioned within processing chamber 260. A number of melting beam sources 212, 214, 216, 218 are configured to melt layers of metal powder on build platform 220 to generate coupon(s) 200. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses parts for each slice, as defined by code 2340. For example, in FIG. 5, melting beam source 212 is shown creating a layer of metal coupon(s) 200 using melting beam 262 in one region, while melting beam source 216 is shown creating a layer of metal coupon(s) 200 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 5, an applicator (or re-coater blade) 270 may create a thin layer of raw material 272 spread out as the blank canvas from which each successive slice of the final coupon will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 260 accessible by applicator 270. In the instant case, coupon(s) 200 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (Ni- CrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247 LC, Mar M 247 and any precipitation harden-able (PH) nickel alloy. Component 202 and metal coupon 200 may include any superalloy material listed herein.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate metal coupon(s) 200 according to embodiments of the disclosure.

While a particular AM system 210 has been described herein, it is emphasized that the teachings of the disclosure are not limited to any particular additive manufacturing system or method. Also, while the teachings of the disclosure relate to an additively manufactured metal coupon(s) 200, it will be recognized that component 202 may be manufactured in any now known or later developed manner such as additive manufacturing (perhaps similar to that described for metal coupon(s) 200), casting, or other methodology. Component 202 may include any of the material(s) listed herein for metal coupon(s) 200.

Figures 7A, 7B, 7C, 7D:
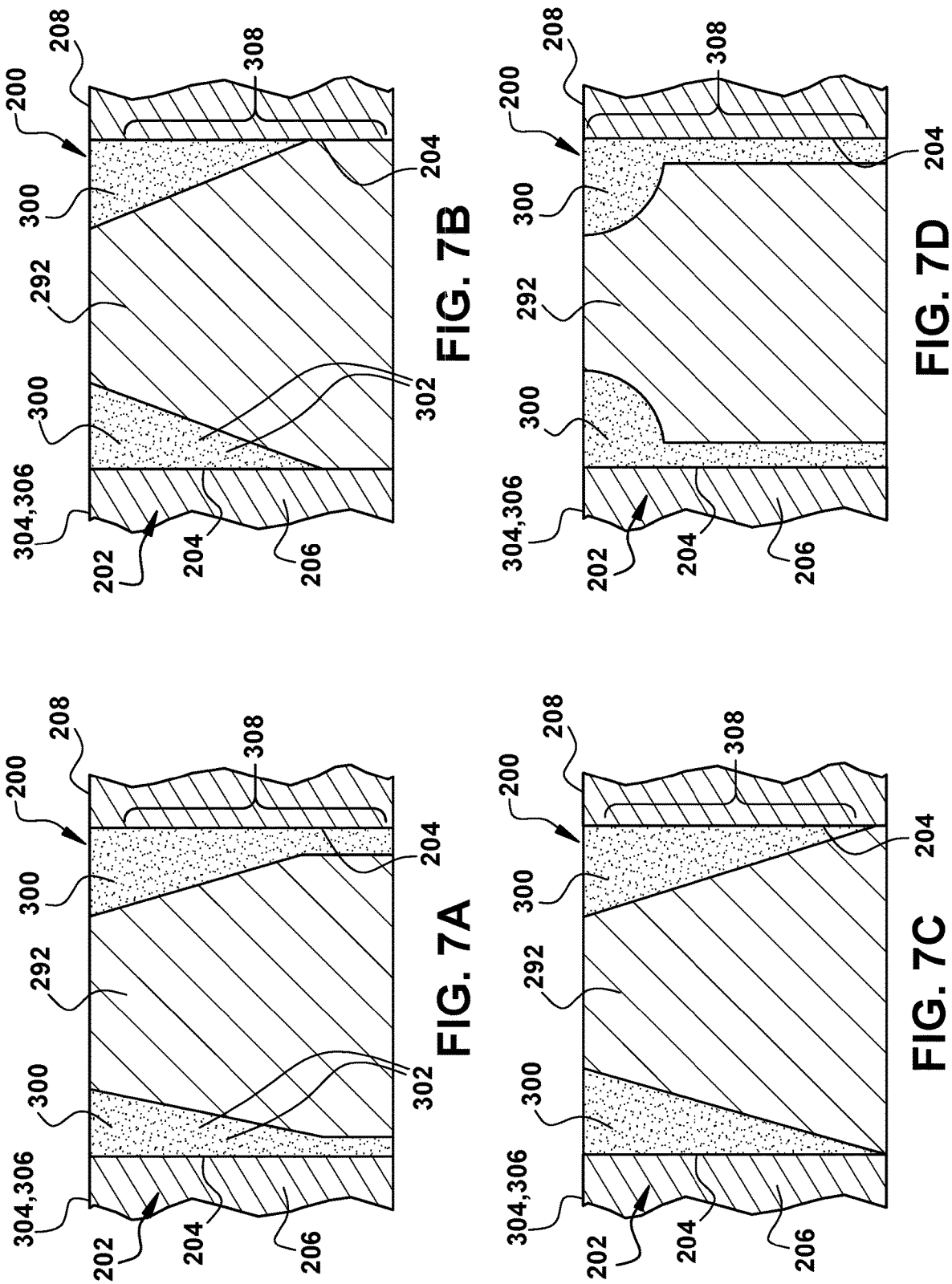
FIGS. 7A-Q show perspective views of a metal coupon according to various embodiments of the disclosure.
Figures 7E, 7F:
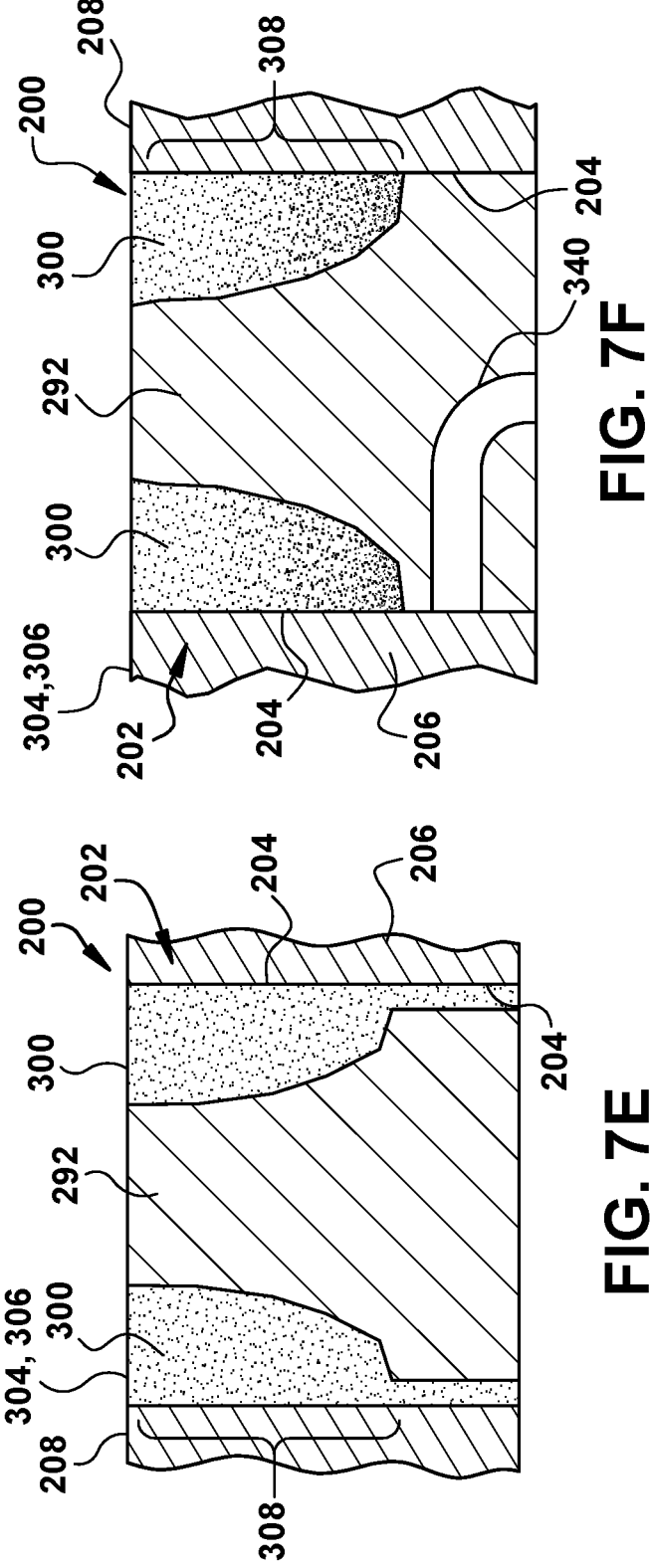
Figures 7G, 7H, 7I, 7J:
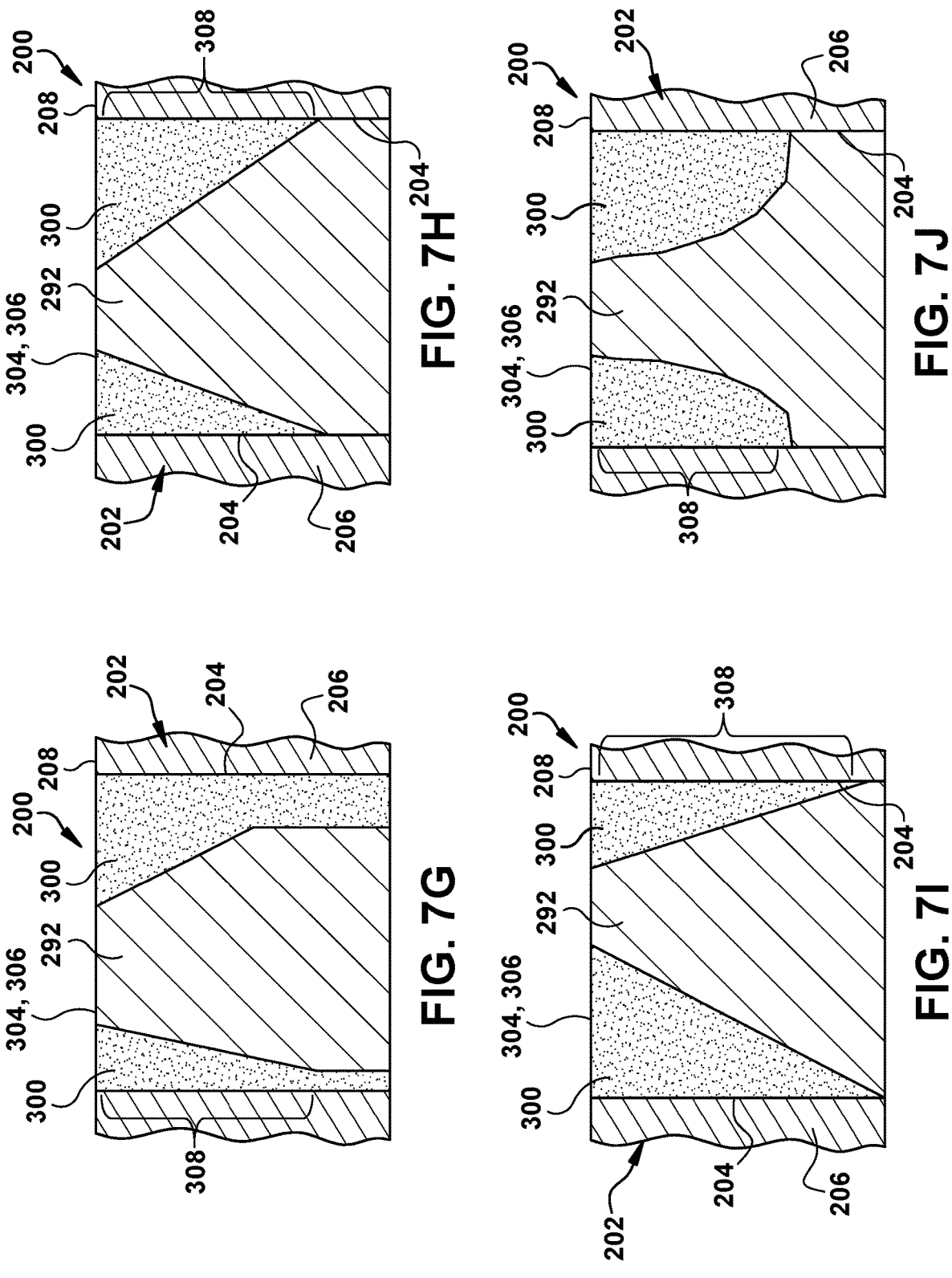
Figures 7K, 7L:
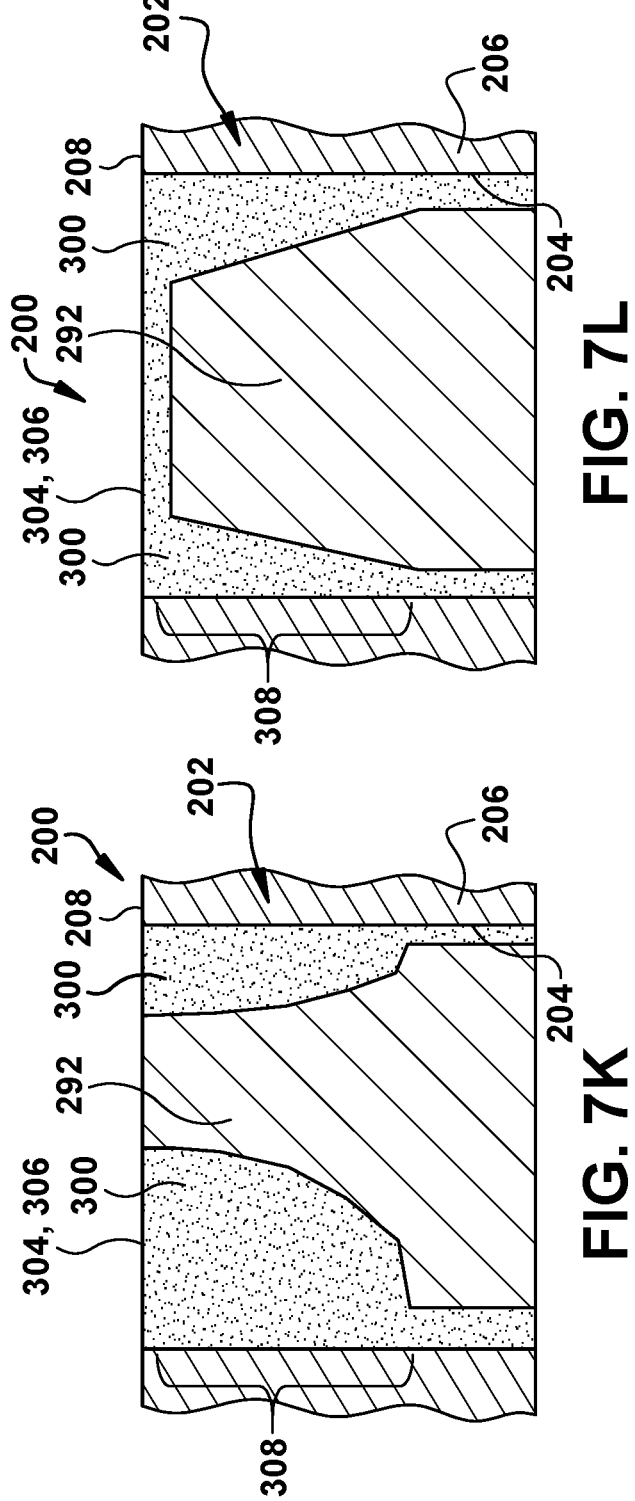
Figures 7P, 7Q:
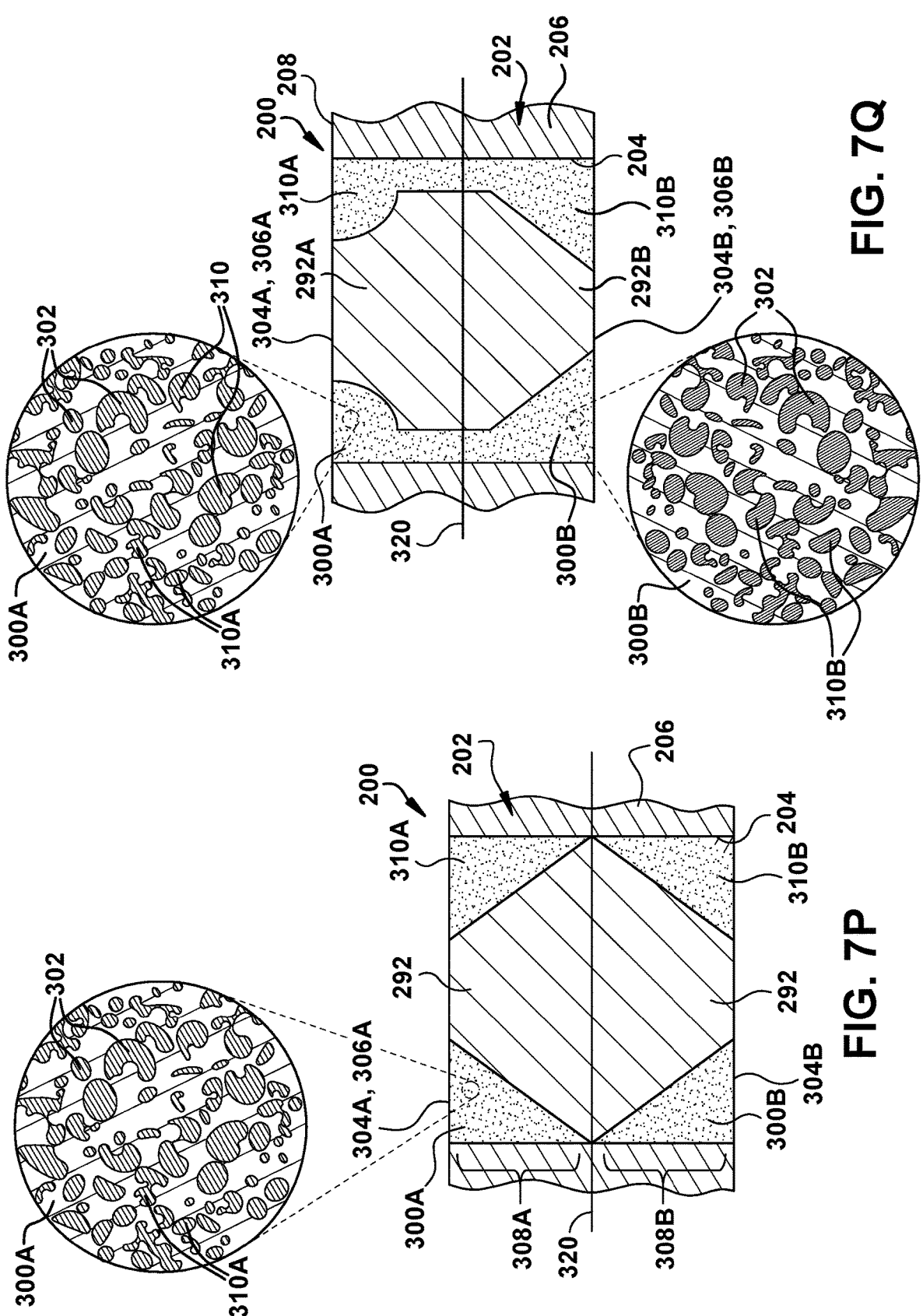

FIGS. 7A-Q show cross-sectional views and FIGS. 8A-E show top-down views of illustrative additively manufactured (AM) metal coupons 200 for inserting into coupon opening 204 in component 202. Body 206 of component 202 with coupon opening 204 are partially shown in FIGS. 7A-Q and 8A-E for context. AM metal coupon 200 includes an additively manufactured (AM) metal member 290 including a dense region 292 and a porous region 300 (with pores 302 (FIG. 7A only for clarity)) adjacent dense region 292, and a coupon outer surface 304. Porous region 300 has a first cross-sectional area at a first location 306 at or near coupon outer surface 304 and a second cross-sectional area less than the first cross-sectional area at a second location 308 distal from coupon outer surface 304. As used herein, hereafter "first location 306" means at or near coupon outer surface 304 and "second location 306" means distal from coupon outer surface 304. Dense region 292 may have a third cross-sectional area at first location 306 and a fourth cross-sectional area greater than the third cross-sectional area at second location 308. A thickness or depth of the first cross-sectional area into AM metal coupon 200 can be user selected but is typically not more than, for example, 0.010 millimeters from outer surface 304. Second location 308 can be at any cross-sectional location that is not first location 306. As illustrated, a plurality of, or a range of, second locations 308 may exist within metal coupon 200 as dense portion 292 becomes wider and porous region 300 becomes less wide as one moves from outer surface 304 inwardly into metal coupon 200.

"Porosity," as used herein, is a ratio of open space volume to total volume of the stated structure, e.g., porous region, dense region, etc. Typically, in this regard, porosity is stated as a percentage of volume of open space to overall or total volume of the stated structure. The open space is empty areas in a solid (highly dense) material and may be referred to herein as "pores" 302 and may include interconnecting passages in the material of the stated structure. A "porous region" in metal coupon 200 is thus less than 100% dense and includes open spaces in the form of pores 302 and/or interconnecting passages. In contrast, "dense region" 292 as used herein has little to no porosity, i.e., it has less than 1% porosity. Dense region 292 is incapable of having braze material 310 infiltrate into it, and thus maintains and/or directs any liquified braze material 310 in porous region 300 with its outer surface. Porous metal coupons 200 may include dense region 292, but also include one or more porous regions 300 that are less than 100% dense. As used herein, a three-dimensional boundary of a porous region or sub-region thereof for purpose of identifying a "total volume" thereof can be identified by where a change in porosity of greater than 2% relative to an adjacent region or sub-region occurs within metal coupon 200 and/or an edge of metal coupon 200 exists. "Open space volume" is collectively a three-dimensional space that is empty, i.e., a void, gap, empty space and/or not filled with material, within a region or sub-region. As used herein, "different porosities" or "differences in porosity," generally means any variety of characteristics such as: percentage of open space volume to total volume, a number of pores 302 in a given volume, the volume (i.e., size) of pores 302, shape of pores 302, and variations in connecting passages between pores 302 that may not be recognized as actual discrete pores (referred to herein as "pore connecting passages"). As one non-limiting example only, pore size can be in a range of, for example, $1.07 \times 10^{-6}$ to $8.58 \times 10^{-3}$ cubic millimeters ($6.54 \times 10^{-11}$ to $5.24 \times 10^{-7}$ cubic inches), or as another non-limiting example, the pore diameter can be in a range of 0.0127 mm to 0.254 mm (0.0005 inches to 0.01 inches). In the drawings, the different porous regions or sub-regions are typically shown as being continuous or in contact with one another, it is emphasized however that they can be isolated from one another in any manner, e.g., with solid areas therebetween. That is, a single metal coupon may include one or more isolated, non-contacting porous regions or sub-regions. Note, the terms "region" and/or "sub-region" may be used interchangeably to denote changes in porosity. With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume.

Porous metal coupon(s) 200 can be formed with different porous regions with different porosities (which may or may not include one or more porous sub-regions with different porosities) using AM system 210 as described herein, or any other metal additive manufacturing system or method capable of forming porous metals. In terms of AM system 210 operation, melting beam sources 212, 214, 216, 218 can be programmed to intermittently not sinter metal, leaving metal powder rather than solid material. This process may include overlapping laser field regions by different amounts and/or designing pores 302 into a build file, i.e., code 2340. Less overlap of each laser scan creates more porosity, and more lasers overlap between successive scans creates less porosity. Laser spot size, scanning speed, focus and power can also be controlled to adjust porosity. More particularly, the additively manufacturing includes using AM system 210 having one or more melting beam sources 212, 214, 216, 218 to fuse together the layers of the metal powder and adjusting a parameter of the system to control the porosity of the at least two porous regions. The adjusting a parameter may include at least one of: adjusting an amount of overlap of a melting area of the one or more melting beam 262, 262' (FIG. 5) (from sources 212, 214, 216, 218); adjusting system scanning speed; and adjusting at least one of melting beam spot size, focus, or power. When the un-melted metal powder is removed from metal coupon(s) 200, it leaves pores 302 with interconnecting passages between pores 302 and creating one or more porous region(s) in metal coupon 200. In any event, the layered manufacture of metal coupon 200 can be controlled to create the desired porosity for any number, shape and/or size of porous regions within any desired layers of metal coupon(s) 200.

FIGS. 6A-D show top-down schematic views of sample metal coupons 200 having different porosities. Pores 302 are shown as darker open spaces in the drawings. FIG. 6A shows a sample metal coupon 200 having a first porosity of approximately 40% open space volume to total volume of the sample (with a generally low amount of open space and more or larger pores 302), FIG. 6B shows a sample metal coupon 200 having a first porosity of approximately 30% open space volume to total volume of sample, FIG. 6C shows a sample metal coupon 200 having a first porosity of approximately 20% open space volume to total volume of the sample, FIG. 6D shows a sample metal coupon 200 having a first porosity of approximately 10% open space volume to total volume of the sample (with a generally low amount of open space). Each porous region may have a porosity between 2% to 50% open space volume to total volume of the porous region, i.e., 2% to 50% open space with the other 50% to 98% solid. In other embodiments, each porosity may be between 10% to 40% open space volume to total volume of porous region 300, i.e., 10% to 40% open space with the other 60% to 90% solid. In other embodiments, porous region(s) can be provided in metal coupons 200 having a porosity in a range of less than 10%, in a range of less than 15%, in a range of less than 20%, in a range of less than 25%, in a range of less than 30%, in a range of less than 35%, in a range of less than 40%, in a range of less than 45%, in a range of 2% to 45%, in a range of 2% to 40%, in a range of 2% to 35%, in a range of 2% to 30%, in a range of 2% to 25%, in a range of 2% to 20%, in a range of 5% to 45%, in a range of 5% to 40%, in a range of 5% to 35%, in a range of 5% to 30%, in a range of 5% to 25%, in a range of 5% to 20%, in a range of 10% to 45%, in a range of 10% to 40%, in a range of 10% to 35%, in a range of 10% to 30%, in a range of 10% to 25%, in a range of 10% to 20%, in a range of 15% to 45%, in a range of 15% to 40%, in a range of 15% to 35%, in a range of 15% to 30%, in a range of 15% to 25%, in a range of 15% to 20%, in a range of 10% to 50%, in a range of 20% to 50%, in a range of 25% to 50%, in a range of 30% to 50%, in a range of 35% to 50%, or in a range of 40% to 50%. As will be described herein, other ranges of porosity are also possible.

Figures 8A, 8B, 8C, 8D, 8E:
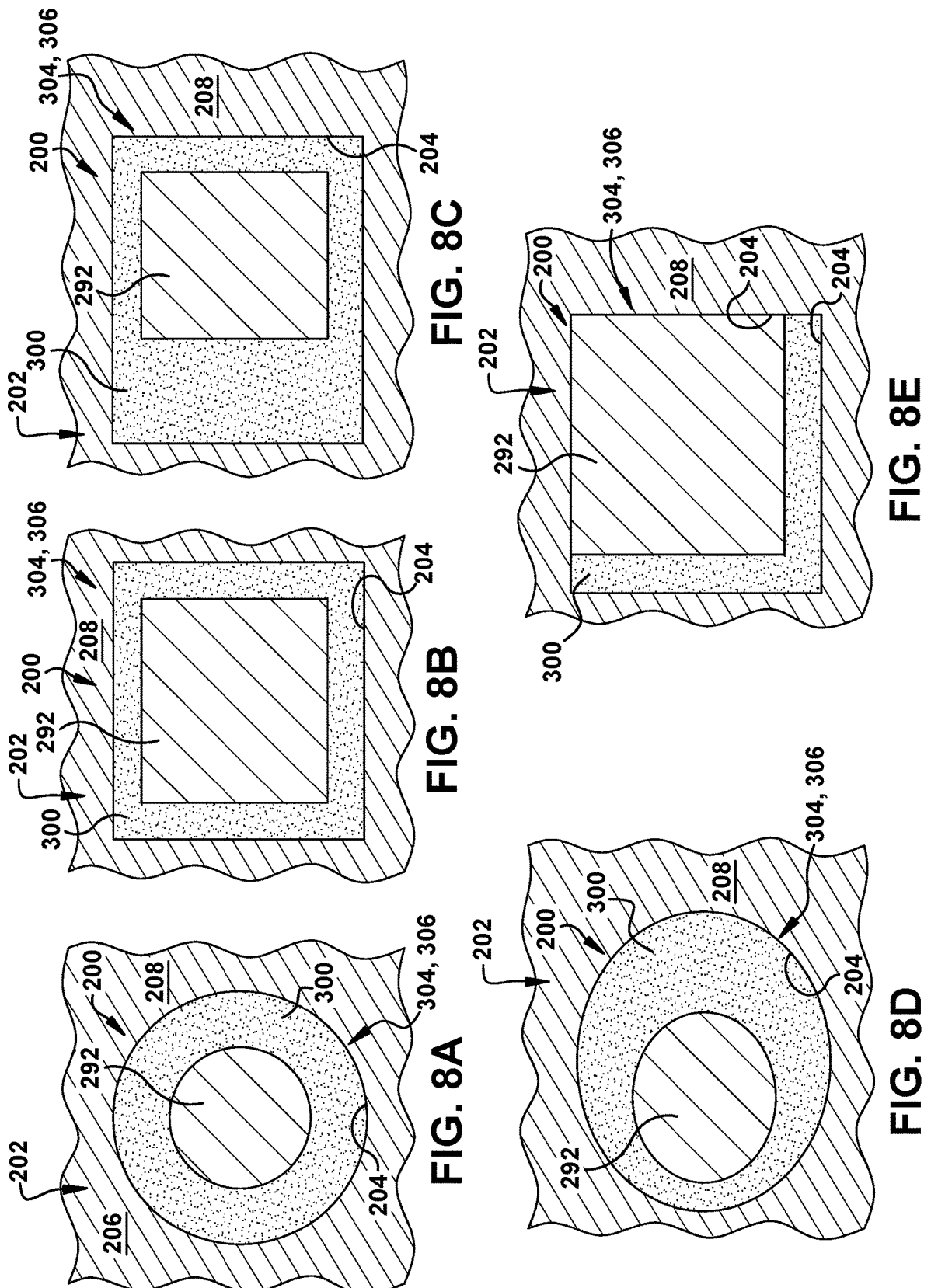
FIGS. 8A-E show top-down views of a metal coupon according to various embodiments of the disclosure.

With further regard to FIGS. 7A-Q and FIGS. 8A-E, metal coupon 200 may take a variety of forms. Metal coupon 200 in FIGS. 7A-Q are shown having an outer shape configured to be positioned in coupon opening 204 in any desired location of component 200. As shown in FIGS. 3 and 4, metal coupon 200 can be used, for example, in a trailing edge 158 or 184 of blade 132 or nozzle 126, respectively, or coupon opening 204 in leading edge 156 or 182 of blade 132 or nozzle 126, respectively. Metal coupon 200 could also be in any tip (not shown) or airfoil section of blade 132 or platform 170 (shown), 174 or airfoil section of nozzle 126. It is emphasized, however, that metal coupons 200 can be employed in any coupon opening 204 in any part of body 206 of any component 202. Body 206 is solid material, e.g., a solid superalloy. In terms of outer shape, metal coupon 200 can have any shape desired to fill coupon opening 204. In FIGS. 7A-L and 7P-Q, metal coupon 200 has a vertical cross-section having straight or parallel sidewalls. However, straight or parallel sidewalls are not necessary in all cases. For example, FIGS. 7M-N show metal coupons 200 having slanted sidewalls for fitting into a coupon opening 204 having mating slanted sidewalls, i.e., angled relative to vertical. FIG. 7O shows a metal coupon 200 having a somewhat T-shaped vertical cross-section, but with slanted sidewalls. The top-down views of FIGS. 8A-E show a small sample of the possible horizontal cross-sectional shapes of metal coupon(s) 200. FIG. 8A shows a circular horizontal cross-section, FIG. 8B shows a square horizontal cross-section, FIGS. 8C and 8E show rectangular horizontal cross-sections, and FIG. 8D shows an oval or elliptical horizontal cross-section. Other horizontal cross-sectional shapes, i.e., the outer cross-sectional shape, of coupon opening 204 are also possible.

In terms of dense region 292 and porous region 300 relative shapes, metal coupon 200 can have a large variety of options within the scope of the disclosure, some of examples of which are shown in FIGS. 7A-Q. In any event, dense portion 292 and porous region 300 are arranged to have liquefied braze material 310 infiltrate porous region 300 and be directed by dense region 292 where desired to couple metal coupon 200 in coupon opening 204 of component 202.

FIG. 7A shows dense portion 292 with a trapezoidal vertical cross-section on an upper section thereof and a rectangular vertical cross-section on a lower section thereof. Porous region 300 has two opposing triangular vertical cross-sections on an upper section thereof and two opposing rectangular vertical cross-sections on a lower section thereof. Hence, this embodiment has a large area for liquefied braze material to enter coupon outer surface 304 and porous region 300 and be directed by dense region 292 toward an inner surface of coupon opening 204.

FIG. 7B shows dense portion 292 with a trapezoidal vertical cross-section on an upper section thereof and a rectangular vertical cross-section on a lower section thereof, and porous region 300 with two opposing triangular vertical cross-sections that terminate at the rectangular vertical cross-section of dense portion 292. Metal coupon 200 in FIG. 7B thus has a contacting joint between dense region 292 and an inner surface of coupon opening 204, i.e., like a typical joint between a coupon and coupon opening 204.

Liquefied braze material 310 would still be able to infiltrate the contacting joint between dense region 292 and coupon opening 204, as in FIG. 7A.

FIG. 7C shows dense portion 292 with a trapezoidal vertical cross-section along an entirety of its height. Porous region 300 similarly has two opposing triangular vertical cross-sections along an entirety of its height. Hence, this embodiment has a large area for liquefied braze material to enter coupon outer surface 304 and porous region 300 and be directed by dense region 292 toward an inner surface of coupon opening 204.

FIGS. 7D and 7E show dense portion 292 with a somewhat trapezoidal (curved sidewalls) vertical cross-section on an upper section thereof and a rectangular vertical cross-section on a lower section thereof. Porous region 300 has two opposing a partially (quarter) circular vertical cross-sections on an upper section thereof and two opposing rectangular vertical cross-sections on a lower section thereof. The slope and/or curvature and the depth of the upper section of porous region 300 in FIG. 7E is slightly more pronounced compared to that in FIG. 7D. In either case, a large area for liquefied braze material is present at coupon outer surface 304 and dense region 292 will direct it toward an inner surface of coupon opening 204.

FIG. 7F shows dense portion 292 with a somewhat trapezoidal vertical cross-section (circular sidewalls) on an upper section thereof and a rectangular vertical cross-section at a lower section thereof, and porous region 300 has two opposing partially circular vertical cross-sections on an upper section thereof that terminate at the rectangular vertical cross-section of dense portion 292. Metal coupon 200 in FIG. 7F, similar to 7B, has a contacting joint between dense region 292 and an inner surface of coupon opening 204, i.e., like a typical joint between a coupon and coupon opening 204. Liquefied braze material 310 would still be able to infiltrate the contacting joint between dense region 292 and coupon opening 204.

FIG. 7M shows dense portion 292 with a trapezoidal vertical cross-section along a length thereof, and porous region 300 has a four sided polygonal vertical cross-section with the upper and lower sides parallel and the upper side shorter than the lower side, and with two opposing and non-parallel vertical sides.

FIG. 7N shows dense portion 292 with a rectangular vertical cross-section along a length thereof, and porous region 300 has two opposing generally triangular vertical cross-sections.

FIG. 7O shows dense portion 292 with a lower, trapezoidal vertical cross-section and an upper, rectangular vertical cross-section (collectively generally T-shape with a wide base), and porous region 300 with two upper, opposing rectangular vertical cross-sections with two opposing, somewhat triangular vertical cross-sections therebelow.

In FIGS. 7A-F and 7M-O, dense region 292 is symmetrically arranged within porous region 300 in terms of most vertical cross-sections, and porous region 300 surrounds dense region 292 in a similarly, symmetric vertical cross-sections. In this manner, assuming generally even distribution of braze material 310 about an interface of metal coupon 200 and coupon opening 204 of body 206 of component 202 at coupon outer surface 304 prior to heating thereof to liquify braze material 310, liquefied braze material 310 may be distributed (flow) evenly within porous region 300 by contact with dense region 292. However, as shown in FIGS. 7G-L, the regions 292, 300 do not need to be symmetrical. Rather, they can be arranged in any manner to direct liquefied braze material 310 where desired. In this manner, assuming generally even distribution of braze material 310 about an interface of metal coupon 200 and coupon opening 204 of body 206 of component 202 prior to heating to liquify braze material 310, more liquefied braze material 310 can be directed by dense region 292 where desired to enhance any physical characteristic described herein.

FIG. 7G shows dense portion 292 with a non-symmetrical trapezoidal vertical cross-section on an upper section thereof and a rectangular vertical cross-section on a lower section thereof. Porous region 300 has two opposing triangular vertical cross-sections on an upper section of different sizes and/or shapes and two opposing rectangular vertical cross-sections on a lower section thereof of different sizes. Here, more liquefied braze material 310 would be directed to the right side of metal coupon 200 than the left side, as shown.

FIG. 7H shows dense portion 292 with a non-symmetrical trapezoidal vertical cross-section on an upper section thereof and a rectangular or close-to rectangular vertical cross-section on a lower section thereof. Porous region 300 has two opposing, non-symmetrical triangular vertical cross-sections that terminate at the rectangular or close-to rectangular vertical cross-section of dense portion 292. Metal coupon 200 in FIG. 7H thus has a contacting joint between dense region 292 and an inner surface of coupon opening 204, i.e., like a typical joint between a coupon and coupon opening 204. Braze material 310 would still be able to infiltrate the contacting joint between dense region 292 and coupon opening 204. Here, more liquefied braze material 310 would be directed to the right side of metal coupon 200 than the left side, as shown.

FIG. 7I shows dense portion 292 with a non-symmetrical, trapezoidal vertical cross-section along an entirety of its height. Porous region 300 similarly has two opposing, non-symmetrical triangular vertical cross-sections along an entirety of its height. Here, more liquefied braze material 310 would be directed to the left side of metal coupon 200 than the right side, as shown.

FIGS. 7J and 7K show dense portion 292 with a non-symmetrical, somewhat trapezoidal (curved sidewalls) vertical cross-section on an upper section thereof and a rectangular or close-to rectangular vertical cross-section on a lower section thereof. Porous region 300 has two opposing, non-symmetrical, partially (quarter) circular vertical cross-sections on an upper section thereof. In FIG. 7K, porous region 300 also includes two opposing, non-symmetrical, rectangular vertical cross-sections on a lower section thereof. The slope and/or curvature and the depth of the upper section of porous region 300 in FIGS. 7J and 7K can be the same or different. In FIG. 7J, more liquefied braze material 310 would be directed to the right side of metal coupon 200 than the left side, and in FIG. 7K, more liquefied braze material 310 would be directed to the left side of metal coupon 200 than the left side. While particular asymmetric arrangements have been illustrated and described, it is emphasized that any asymmetric arrangement can be used.

FIG. 7L shows an embodiment similar to that of FIG. 7A, but with porous region 300 over an upper surface of dense region 292. Hence, this embodiment has an entirely porous coupon outer surface 304 for liquefied braze material and be directed by dense region 292 toward an inner surface of coupon opening 204.

In FIGS. 7A-7O, metal coupon 200 is described having a single first location 306, i.e., a single outer surface 304. However, as shown in FIGS. 7P-Q and as understood in the art, metal coupon 200 may have more than one outer surface 304A, 304B, and hence, more than one first location 306A, 306B. For example, referring to FIGS. 3, 4 and 7P-Q, metal coupon 200 may have outer surface 304A on a first part or side 326 of component 202 and another outer surface 304B on a different part or side 328 of component 202, i.e., where coupon opening 204 extends through two surfaces of body 206 of component 202. In one example, referring to FIGS. 3 and 4, first part or side 326 of component 202 may be a first (concave, pressure) side outer walls 152, 178 of airfoil 150, 176 and second part or side 328 of component 202 may be a second (convex, suction) side outer wall 154, 180 of an airfoil 150, 176. Other arrangements in different types of components 202 are also possible. In this case, braze material 310 may be provided on both sides 326, 328, heated and allowed to be directed into porous regions 300A, 300B by capillary action and directed by a common dense region 292. Each porous region 300A, 300B has a respective first location 306A, 306B and second location 308A, 308B, as described herein. Although FIG. 7P shows metal coupon 200 as having two porous regions 300A, 300B mirrored across a horizontal line 320 as in the FIG. 7C embodiment, any embodiment shown in FIGS. 7A-O can be mirrored across a horizontal line 320 to create a two outer surface metal coupon arrangement. Furthermore, while FIG. 7P shows metal coupon 200 having two of the same dense region 292 and porous regions 300A, 300B arrangements mirrored across a horizontal line 320 (i.e., two porous regions 300A, 300 as in the FIG. 7C embodiment), as shown in FIG. 7Q, different embodiments from FIGS. 7A-O can be arranged on opposite sides of horizontal line 320 to create any desired, two outer surface metal coupon arrangement that is asymmetrical across horizontal line 320. For example, FIG. 7Q shows an embodiment having the FIG. 7D arrangement on one (upper) side of horizontal line 320 and the FIG. 7C arrangement on the other (lower) side of horizontal line 320. The location of horizontal line 320, i.e., the inflection location of the different embodiments, can be anywhere along a height of metal coupon 200. In addition to the above-described customizations, porous regions 300A, 300B may have different porosities to direct braze material 310 in different ways on different sides 326, 328 of component 202, perhaps creating different physical characteristics, as described herein. Different braze materials may be used on either side of horizontal line 320, e.g., where metal coupon 200 is large. In view of the foregoing description, it is apparent that a wide variety of customizations of metal coupon 200 to direct one or more braze materials as desired can be achieved on one or more than one outer surface 208 of component 202.

FIGS. 8A-E show top-down views of metal coupons 200 illustrating example arrangements of dense region 292 relative to centering within porous region 300 at first location 306, i.e., at or near the outer surface of metal coupon 200. With further regard to the symmetry or asymmetry of dense region 292 and porous region 300, in FIGS. 7A-F, dense region 292 is shown generally centered within porous region 300. However, as shown in FIGS. 7G-K, dense region 292 does not need to be centered within porous region 300. FIGS. 8A-B show dense region 292 and porous region 300 concentric to one another, and hence symmetric in a vertical cross-section. FIG. 8A shows regions 292, 300 having circular, horizontal cross-sections, and FIG. 8B shows regions 292, 300 having a polygonal (e.g., square) horizontal cross-section. The FIGS. 8A-B arrangements may correspond to any vertical cross-sections shown in FIGS. 7A-F, 7M-Q. In contrast, FIG. 8C shows dense region 292 and porous region 300 non-concentric to one another. In FIG. 8C, dense region 292 has a square horizontal cross-section non-centered within a rectangular horizontal cross-section of porous region 300. FIG. 8D shows a similar arrangement as FIG. 8C but with oval or elliptical horizontal cross-sections. FIG. 8E shows an example in which porous region 300 does not surround dense region 292. Here, dense region 292 and porous region 300 both contact certain inner surface(s) of coupon opening 204. This arrangement, assuming generally even distribution of braze material 310 about an interface of metal coupon 200 and coupon opening 204 of body 206 of component 202 prior to heating to liquify braze material 310, directs more liquefied braze material 310 to the left side and lower side of metal coupon 200 as shown on the page of FIG. 8E.

In FIGS. 7A and 7C-Q, metal coupon 200 is shown in a coupon opening 204 that extends through body 206 of component 202. However, as shown in FIG. 7B, coupon opening 204 can have any depth into body 206 of component 202 and does not need to extend through body 206.

With further regard to porous regions 300, in FIGS. 7A-E and 7G-Q, metal coupon 200 is illustrated with each porous region 300 having a uniform porosity. However, as shown in FIG. 7F, any porous region 300 described herein can have a variable porosity. Here, areas within layers of metal coupon 200 that define porous region 300 can be formed to include pores 302, e.g., of different size or number, to create the different porosities. The variable porosity may have any porosity that changes, e.g., increases, decreases and/or both increases and decreases. The change in porosity may be gradual or stepped or otherwise incremental. In one example, the variable porosity may have a higher porosity at first location 306 and a lower porosity towards a bottom of the coupon opening 204, e.g., at any second location 308. In this manner, porous region 300 may include more braze material 310 at first location 306 than at any second location 308. In other options, the variable porosity could be mixed and matched to provide a higher porosity at any location of metal coupon 200 where more braze material 310 is desired, and similarly, a lower porosity where less braze material 310 is desired. Each porous region 300 may have a porosity between 2% to 50% open space volume to total volume of porous region 300, i.e., 2% to 50% open space with the other 50% to 98% dense. In other embodiments, each porosity may be between 10% to 40% open space volume to total volume of porous region 300, i.e., 10% to 40% open space with the other 60% to 90% dense. Other ranges of porosity are also possible. For example, porous regions 300 can have any porosity described herein.

Referring to FIGS. 3, 4, 7A-Q and 9A-L, embodiments of a method according to the disclosure will now be described. The method may include coupling a metal coupon 200 in coupon opening 204 in component 202. The method may also include repairing a component 202 having a defect and component surface 208. FIGS. 9A-L show various views of the method according to embodiments of the disclosure.

Figure 9A:
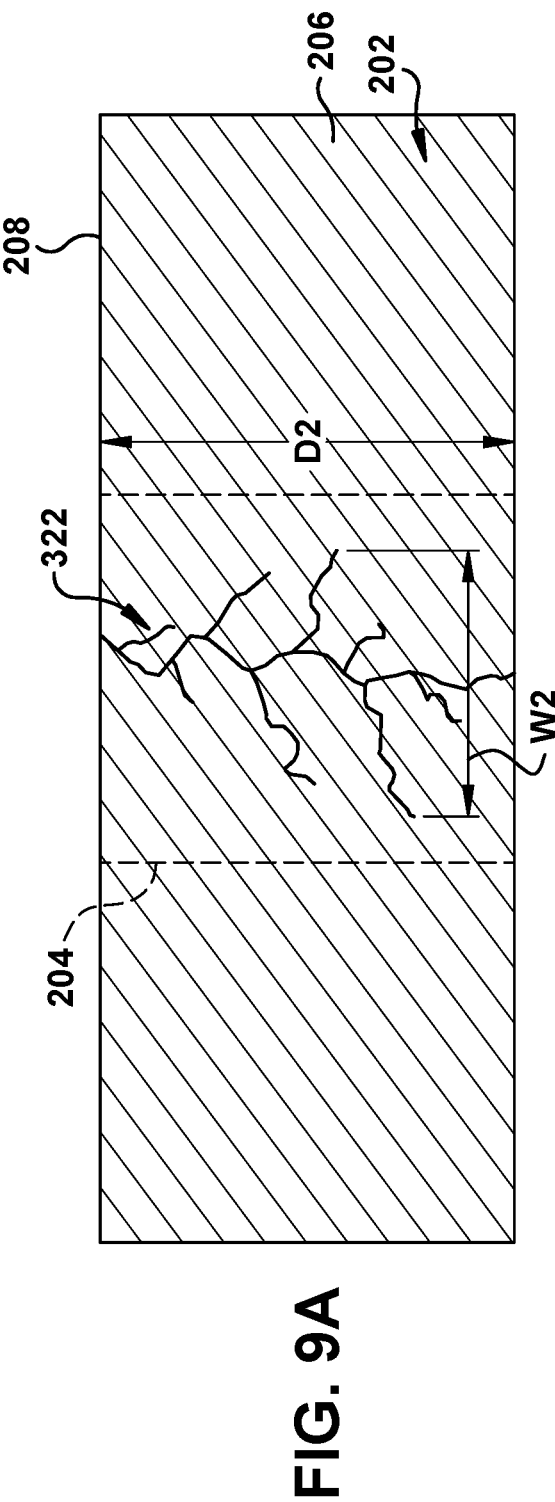
FIGS. 9A-L show perspective views of methods according to various embodiments of the disclosure.
Figures 9B, 9C:
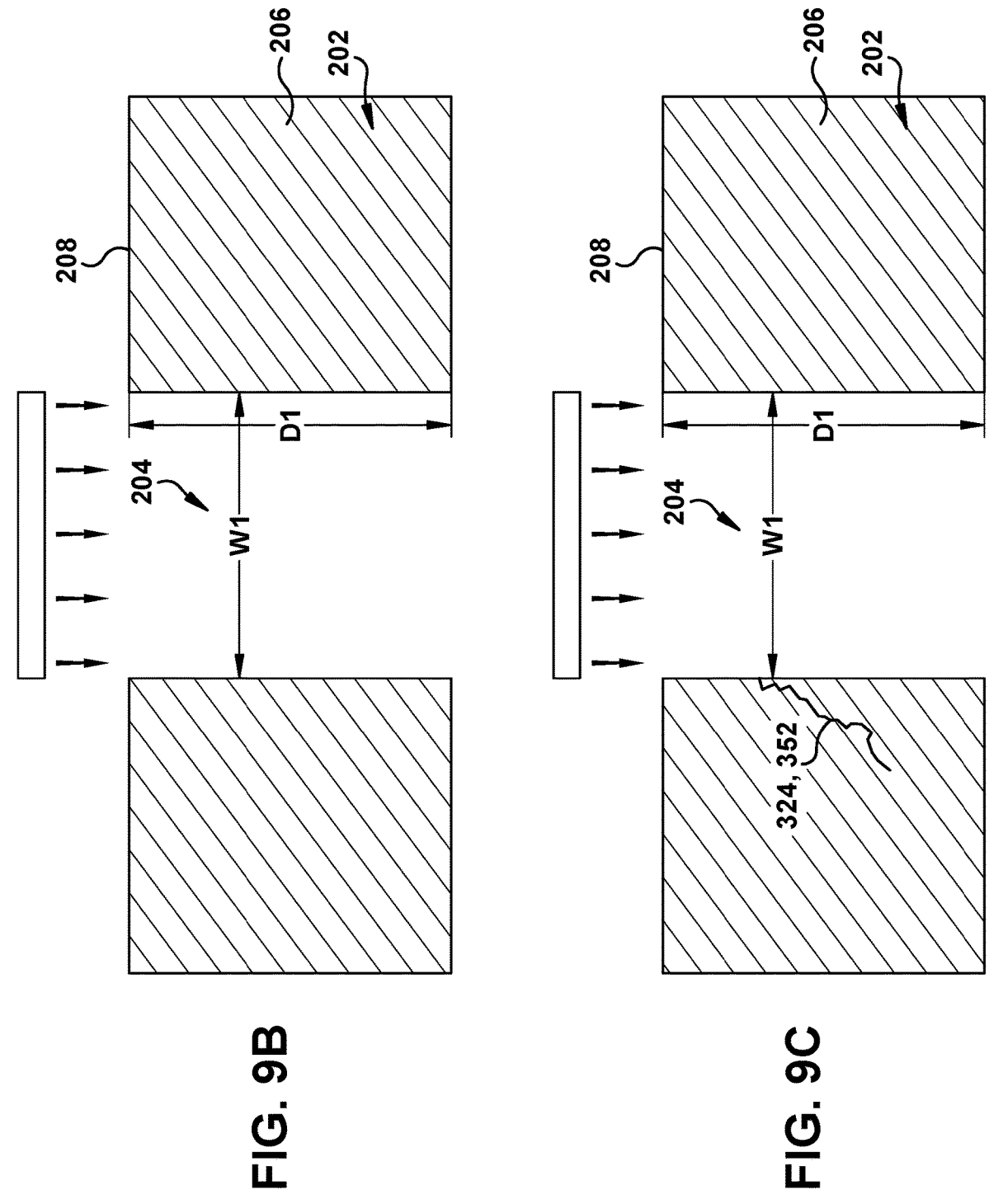
Figures 9D, 9E:
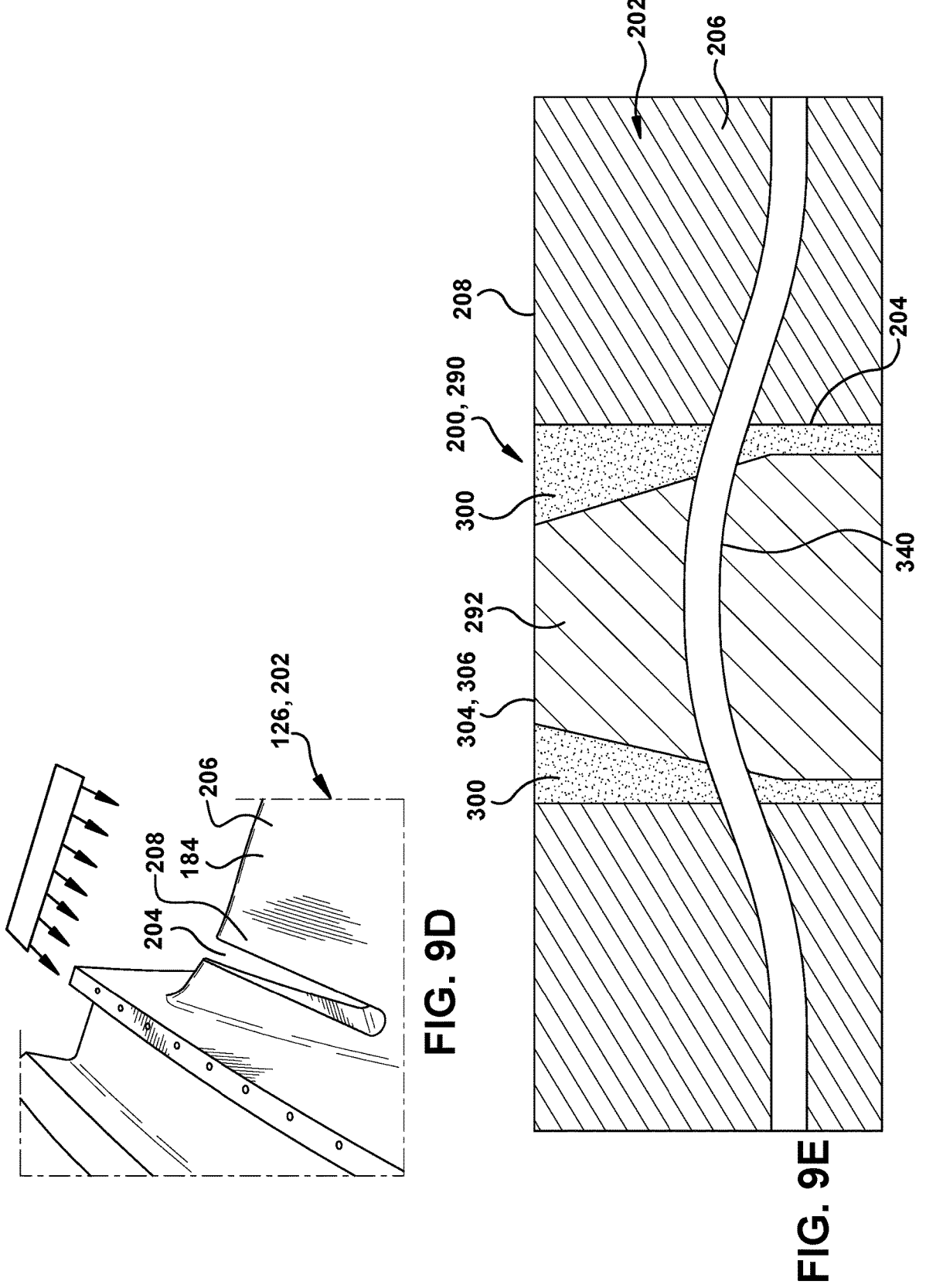

FIGS. 9A-C show cross-sectional views of forming coupon opening 204 in body 206 of component 202, and FIG. 9D shows a perspective view of forming coupon opening 204 in body 206 of component 202 according to the illustrative application in FIG. 4 of a nozzle 126. In certain applications, coupon opening 204 is formed by removing defect 322 from body 206 of component 202, but coupon opening 204 can also be in an original version of component 202, e.g., at a location that is challenging to manufacture with the rest of component 202. With regard to repairing component 202, FIGS. 9A-C show removing at least part of a defect 322 at component surface 208 by forming coupon opening 204 in component 202. Coupon opening 204 is configured to receive metal coupon 200. Coupon opening 204 may have any shape desired. In the non-limiting example shown in FIG. 9D, coupon opening 204 is in a trailing edge 184 of a nozzle 126. As shown in FIG. 9A, coupon opening 204 (dashed box) (in component 202 at defect 322 and component surface 208) is formed such that coupon opening 204 is disposed on either side of the defect 322. Coupon opening 204 can be formed using any now known or later developed machining, e.g., drilling, grinding, electric discharge machining, etc. As shown by a dashed box in FIGS. 9B-C and for metal coupon 200 in FIG. 7B, coupon opening 204 can extend partially through body 206 of component 202. Alternatively, as shown in FIGS. 9B-D, coupon opening 204 may be formed to extend fully through body 206 of component 202. In certain cases, as shown in FIGS. 9A-B, forming coupon opening 204 may remove all of defect 322. In this case, coupon opening 204 defines a first width W1 and defect 322 defines a second width W2, and first width W1 is larger than second width W2. Similarly, coupon opening 204 defines a first depth D1 and defect 322 defines a second depth D2, and first depth D1 is larger than second depth D2. In alternative embodiments, removing defect 322 may include leaving a remaining portion 324 of defect 322. Remaining portion 324 can take any the form of any part of defect 322. In the one example shown in FIG. 9B, remaining portions 324 includes a defect coupon opening 352 in the form of a crack extending from coupon opening 204 into body 206. As will be further described herein, when braze material 310 infiltrates porous region 300, it may also infiltrate into at least part of remaining portion 324 of defect 322.

FIGS. 9B-D also show creating a model of coupon opening 204. After forming coupon opening 204, a model of coupon opening 204 can be created. The model creating may include using any now known or later developed three-dimensional scanner (not shown, see arrows) to scan and create a digitized representation of coupon opening 204 relative to body 206 of component 202. As the process of scanning and modeling a part is well known in the art, further details are omitted so the reader can focus on the salient aspects of the disclosure.

FIGS. 5, 7A-Q show additively manufacturing metal coupon 200. As noted, metal coupon 200 includes AM metal member 290 including dense region 292 and porous region(s) 300 (with pores 302) adjacent dense region 292, and coupon outer surface(s) 304. Porous region(s) 300 have a first cross-sectional area at first location(s) 306 at or near coupon outer surface(s) 304 and a second cross-sectional area less than the first cross-sectional area at second location(s) 308 distal from respective coupon outer surface(s) 304. Dense region 292 may have a third cross-sectional area at first location(s) 306 and a fourth cross-sectional area greater than the third cross-sectional area at second location(s) 308. As noted, second location(s) 308 can be at any cross-sectional location that is not a respective first location 306. As illustrated, a plurality of, or a range of, second locations 308 may exist within metal coupon 200 as dense portion 292 becomes wider and porous region 300 becomes less wide as one observes from outer surface 304 inwardly into metal coupon 200. Any porosity described herein for metal coupon 200 can be formed during the additive manufacturing. Any variable porosity in porous region 300 may include a changing porosity. As noted, the porosity change may be gradual, stepped or incremental. The variable porosity may include sub-regions that are different from each other in terms of at least one of the following characteristics: percentage of open space volume to total volume, pore shape, pore size, number of pores, and pore connecting passages. The additive manufacture may include any AM process described herein to manufacture porous metal coupon 200 (or dense or solid regions). The additive manufacturing may include selectively forming porous region(s) 300 among dense regions 292 of metal coupon 200 by controlling AM printer 232. The additive manufacturing may include manufacturing metal coupon 200 to generally match that of coupon opening 204, or to have a near net shape of coupon opening 204 based on the model of coupon opening 204. As used herein, "near net shape" indicates metal coupon 200 is within desired manufacturing tolerances with no or minimal additional processing, e.g., machining, at the specified stage of the manufacturing process. Some additional texturing or polishing to an exterior surface may be desired. It is recognized that additional coatings may be applied once metal coupon 200 is in a component. When formed to a near net shape, metal coupon 200 may also have a shape after manufacture that, when positioned in coupon opening 204, is very close to surface(s) 208 of body 206 required to couple metal coupon 200 in coupon opening 204, e.g., with selected braze material(s) and no or minimal required finishing methods, like machining or grinding. The use of porous region(s) 300 in metal coupon 200, however, accommodates greater joint gap dimensional variance compared to solid/dense coupons with narrow gaps for braze material because the porous regions provide improved braze material grasp and hold despite the larger gaps. While metal coupon 200 is shown additively manufactured as the FIG. 7A embodiment in FIG. 9E, it may take any form described herein.

In accordance with embodiments of the disclosure, porosity of one or more porous regions 300 in metal coupon 200 is controlled, i.e., customized, to control flow of braze material therein during a subsequent brazing process that couples metal coupon(s) 200 into, as shown in FIGS. 3, 4 and 9H-I, coupon opening 204 in body 206 of component 202. Each porous region 300 may be customized in terms of any of the afore-described characteristics that impact porosity. In addition, a shape and/or location of porous regions 300 can be arranged to direct braze material as described herein. Braze material 310 may be distributed in different manners in each porous region 300 depending on porosity, resulting in different physical characteristic(s) of metal coupon 200 in different regions thereof. More particularly, any number of porous regions 300 can be used to customize (create) at least one physical characteristic in component 202 that includes metal coupon 200, such as: joint adhesive bond strength, coupon strength, stress/strain resistance, ductility, wear resistance, oxidation resistance, cycle fatigue, thermal conductivity, electrical conductivity, surface roughness, hardness, and mass. In a non-comprehensive list of possibilities, metal coupon 200 may include a higher porosity in one porous region 300 to direct more braze material therein through capillary action compared to other porous regions 300 of metal coupon 200 to control at least one physical characteristic of component 202. In another embodiment, metal coupon 200 may include a lower porosity in one region 300 to direct less braze material therein through capillary action compared to other denser regions of metal coupon 200 to control at least one physical characteristic of component 202. Any arrangement of porous regions 300 described herein is possible to create the desired braze material flow and infiltration.

Figure 9G:
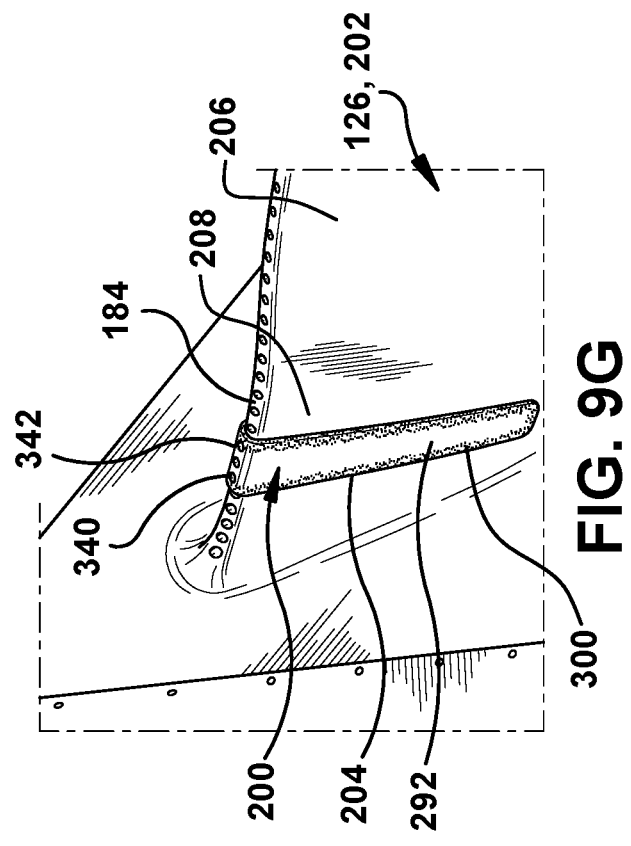

In certain embodiments, the additive manufacturing may also include forming any variety of improvements for component 202 in metal coupon 200 including, for example, structures not previously present in the removed, damaged part. For example, as shown in FIGS. 7F and 9G, the additive manufacture may optionally include forming a cooling passage 340 in metal coupon 200. Cooling passage 340 may extend in metal coupon 200 in any manner, e.g., in a serpentine path therein or extending through an external surface 342 (FIG. 9G) of metal coupon 200. In another example, not shown, the additive manufacture may optionally include forming one or more support and/or cooling structures (e.g., pin/fins) (perhaps with cooling passages (not shown) therein) in metal coupon 200. Any advantageous internal structural changes can be made in metal coupon(s) 200. Any now known or later developed post-additive manufacture finishing processing may be optionally performed on metal coupon(s) 200, e.g., abrading to smooth surfaces thereof. Advantageously, however, the teachings of the disclosure may remove the need for other finishing steps typically used to address residual stresses present in the material post additive manufacturing, e.g., peening, heat treatment, hot isostatic pressing (HIP), among others.

Figure 9F:
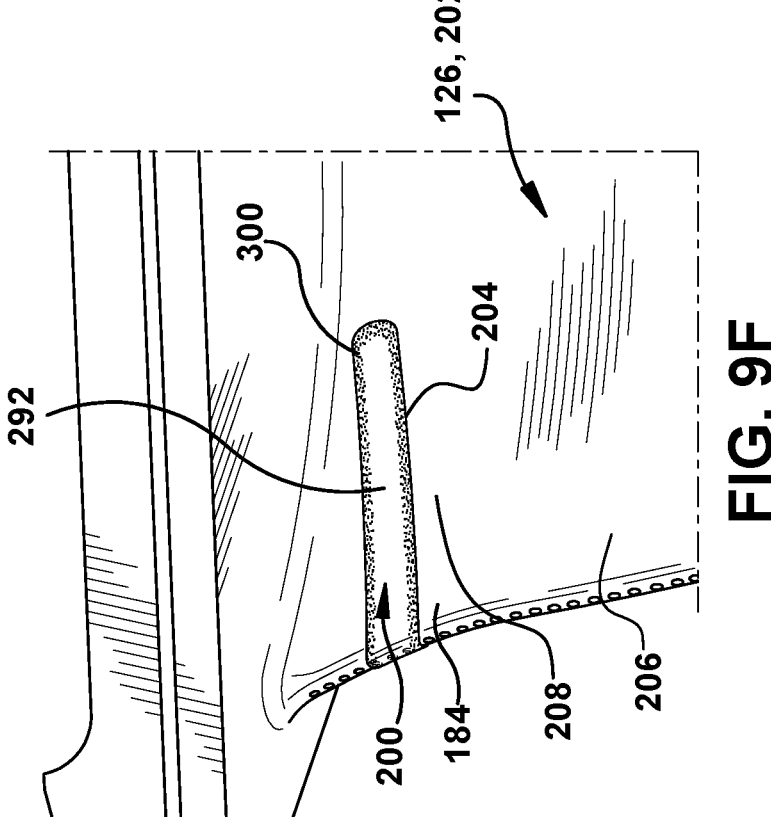

FIGS. 9E-G show positioning metal coupon 200 in coupon opening 204 in body 206 of component 202. Metal coupon 200 may be positioned in opening 204 in body 206 in any now known or later developed manner, e.g., manually via a press fit or slip fit. Where necessary, metal coupon 200 may be held in place in any desired manner, e.g., adhesive, clamps, nickel-chromium tack welds, ball tacks, resistance weld, fusion tack weld, etc.

Figure 9H:
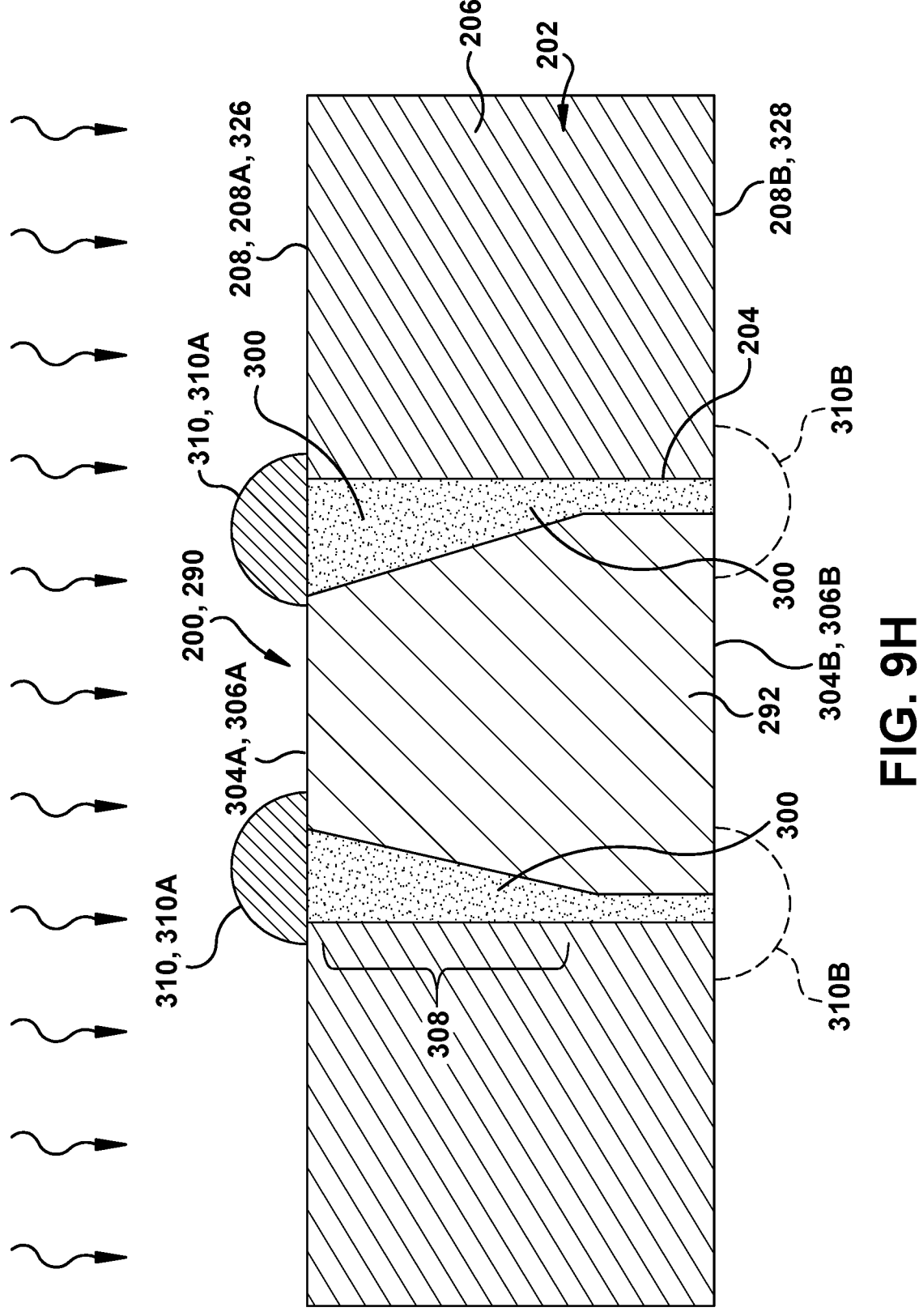
Figure 9I:
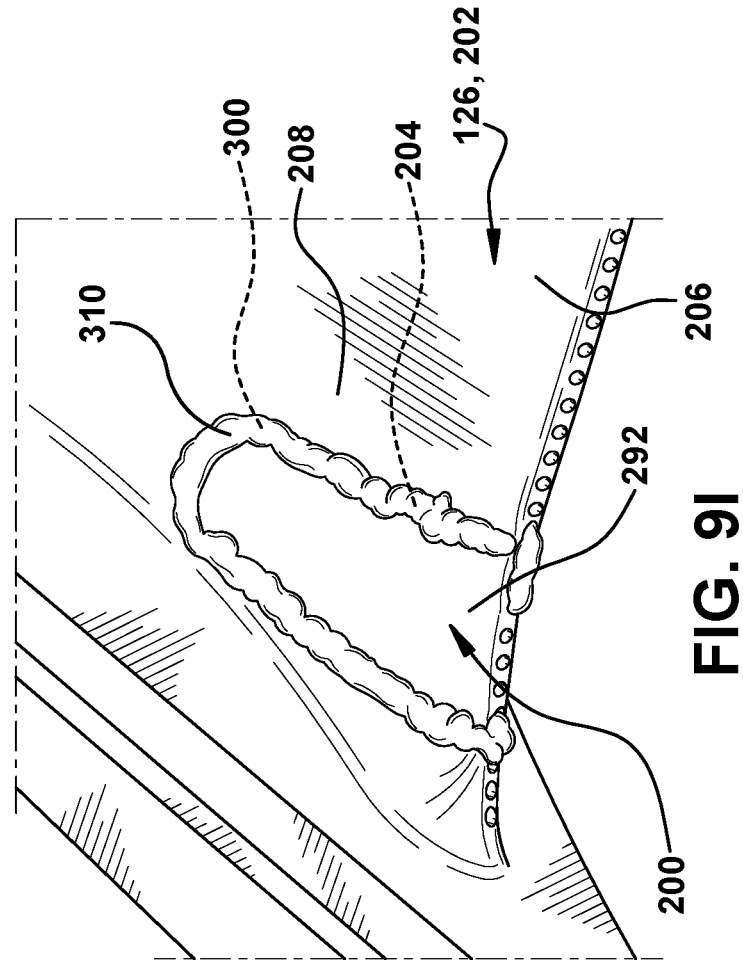
Figure 9J:
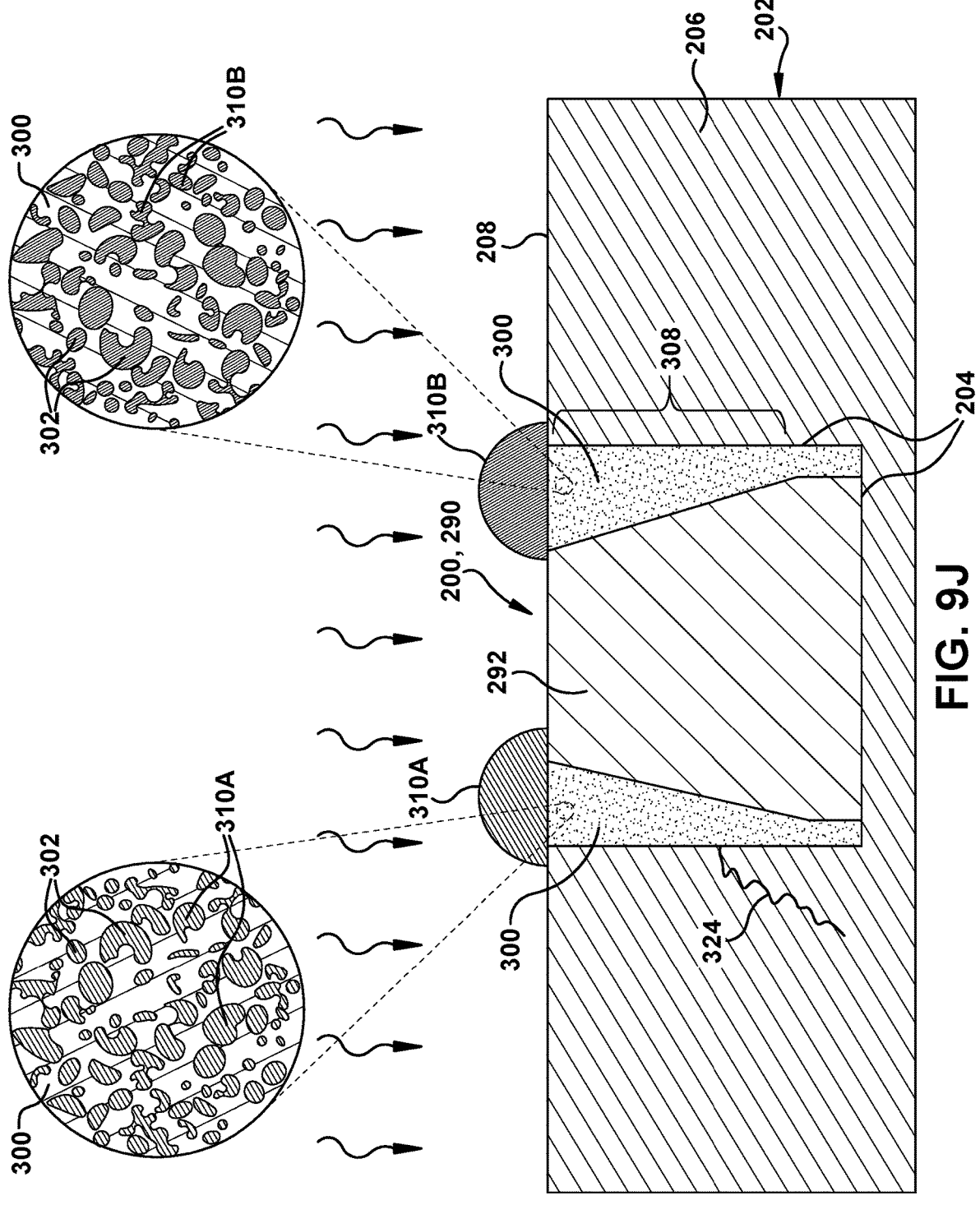

FIGS. 9H-J show positioning a braze material 310 at a junction of coupon outer surface 304 of metal coupon 200 and component surface 208 of component 202. FIGS. 9H-J also show infiltrating braze material 310 into porous regions(s) 300 to couple metal coupon 200 in coupon opening 204 in component 202, i.e., body 206 by performing a brazing process. Braze material 310 may include any now known or later developed brazing composition, such as but not limited to: GE (Alstom) B1P, Amdry™ D15, DF4B, or BRB, some the formulations of which are listed with other braze material formulations in the following table:

| Alloy | Ni | Cr | Co | B | Al | Ta | Y |
|---|---|---|---|---|---|---|---|
| Amdry ™ D15 | 65.10 | 15.30 | 10.30 | 2.30 | 3.50 | 3.50 | 0.00 |
| Amdry ™ BRB | 70.50 | 14.00 | 9.00 | 2.50 | 4.00 | 0.00 | 0.00 |
| Amdry ™ DF4B | 67.15 | 14.00 | 10.00 | 2.75 | 3.50 | 2.50 | 0.10 |

The infiltrating may include any now known or later developed brazing process such as using a vacuum brazing system, induction brazing system, and/or inert gas atmosphere heating system and related techniques. In one non-limiting example, the brazing may include, for example, applying the braze material 310 (FIGS. 9H-I) and applying heat (arrows FIG. 9H) to cause it to liquefy and flow into, through and around metal coupon 200 through capillary action. The infiltrating injects braze material 310 into porous region(s) 300 based at least on a characteristic of the porosity thereof. For example, porous region 300 may include more braze material 310 at first location 306 than at any second location 308. This arrangement may create, for example, a stronger joint adhesive strength at a joint 350 where metal coupon 200 and body 206 meet. Where a variable porosity is present, as in FIG. 9F, the infiltrating includes causing braze material 310 to travel through and infiltrate the variable porosity region base on a characteristic of the variable porosity region (e.g., gradient of the porosity, stepped porosity, among other things). During the infiltrating, braze material 310 is directed towards, for example, an inner surface of coupon opening 204 through porous region 300 and by at least part of dense region 292. Dense region 292 can be shaped and sized, as described herein, to direct liquefied braze material 310 where desired. FIG. 9H also shows an alternative embodiment in which different braze materials 310A, 310B are used on different coupon outer surfaces 304A, 304B and component surfaces 208A, 208B, e.g., where coupon opening 204 extends through body 206. In another embodiment, shown in FIG. 9J, different braze materials 310A, 310B may be used on different parts of the same contiguous porous region 300 on the same coupon outer surface 304 and component surface 208. It will be recognized that different braze materials 310A, 310B can be used with any version of metal coupon 200 described herein. In certain embodiments, the infiltrating may include infiltrating all of braze material(s) 310 positioned at the junction into porous region 300, which reduces the amount of subsequent machining, e.g., to blend surfaces.

The different porosities of porous regions, e.g., 300A, 300B in FIGS. 7P-Q, and perhaps a variable porosity region (FIG. 9F), result in different braze material 310 flow and infiltration. As a result of the brazing process, first porous region 300A and second porous region 300B with braze material 310 therein have at least one different physical characteristic. Where variable porosity region 300D is present, it has perhaps different physical characteristic(s) than porous region(s) 300. For example, variable porosity may have a higher porosity at first location 306 and a lower porosity towards a bottom of coupon opening 204. Here, porous region 300 may include more braze material 310 at first location 306 than any second location 308. Hence, as a result of the brazing process, different porous region(s) 300 (perhaps with a variable porous region) with braze material(s) 310 therein in component 202 have at least one different physical characteristic. For example, more braze material 310 may result in a stronger joint adhesive bond strength, higher ductility, higher thermal or electrical conductivity or higher oxidation resistance, and less braze material 310 may result in less surface roughness, less hardness, less ductility, lower joint adhesive bond strength, lower ductility, lower thermal or electrical conductivity or lower oxidation resistance. In any event, controlling the amount of braze material and the porosity of the different porous regions allows controlling physical characteristics of the final product. Depending on the braze material 310 used, among other factors, the different porosities and different shapes of porous region(s) 300 allow for customization of at least one physical characteristic of component 202, such as: joint adhesive bond strength, stress/strain resistance, ductility, wear resistance, oxidation resistance, thermal conductivity, electrical conductivity, surface roughness, hardness, and/or mass. In addition, the multi-flow paths for braze material 310 using porous regions 300 may decrease the likelihood of a lack of fill and/or voids along a brazed joint compared to the conventional narrow gap-filling brazing process, and due to tight manufacturing tolerances required for narrow gap brazing. Hence, component 202 may be at least 98% dense despite the use of metal coupon 200 with porous region(s) 300 therein.

In certain embodiments, different braze materials 310 may be used in different parts of metal coupon(s) 200, providing further customization of the coupling of metal coupon(s) 200 in component 202 and physical characteristics of regions of component 202. For example, referring to FIG. 9H, a first braze material 310A may be used on a first part or side 326 of component 202 and another braze material 310B (dashed portion on coupon surface 304A), different than first braze material 310A, may be used on a different part or side 328 of component 202. In one example, referring to FIGS. 3 and 4, first part or side 326 of component 202 may be a first (concave, pressure) side outer walls 152, 178 of airfoil 150, 176 and second or side 328 of component 202 may be a second (convex, suction) side outer wall 154, 180 of an airfoil 150, 176. The different braze materials 310A, 310B, in addition to the potentially different porous regions 300, on the different part or sides 326, 328 can be customized for the anticipated environment of component 202 at those locations. As will be recognized, the other variations of braze materials and/or porous regions possible to address different situations are immense.

Other embodiments of a method according to the disclosure may include just forming metal coupon 200 for component 202. In this case, as shown in FIG. 9B-D, the method includes creating a model of coupon opening 204 in body 206 of component 202, and additively manufacturing metal coupon 200 to at least closely fit coupon opening 204, e.g., with a near net shape of coupon opening 204. Metal coupon 200 may take any form described herein.

Figure 9K:
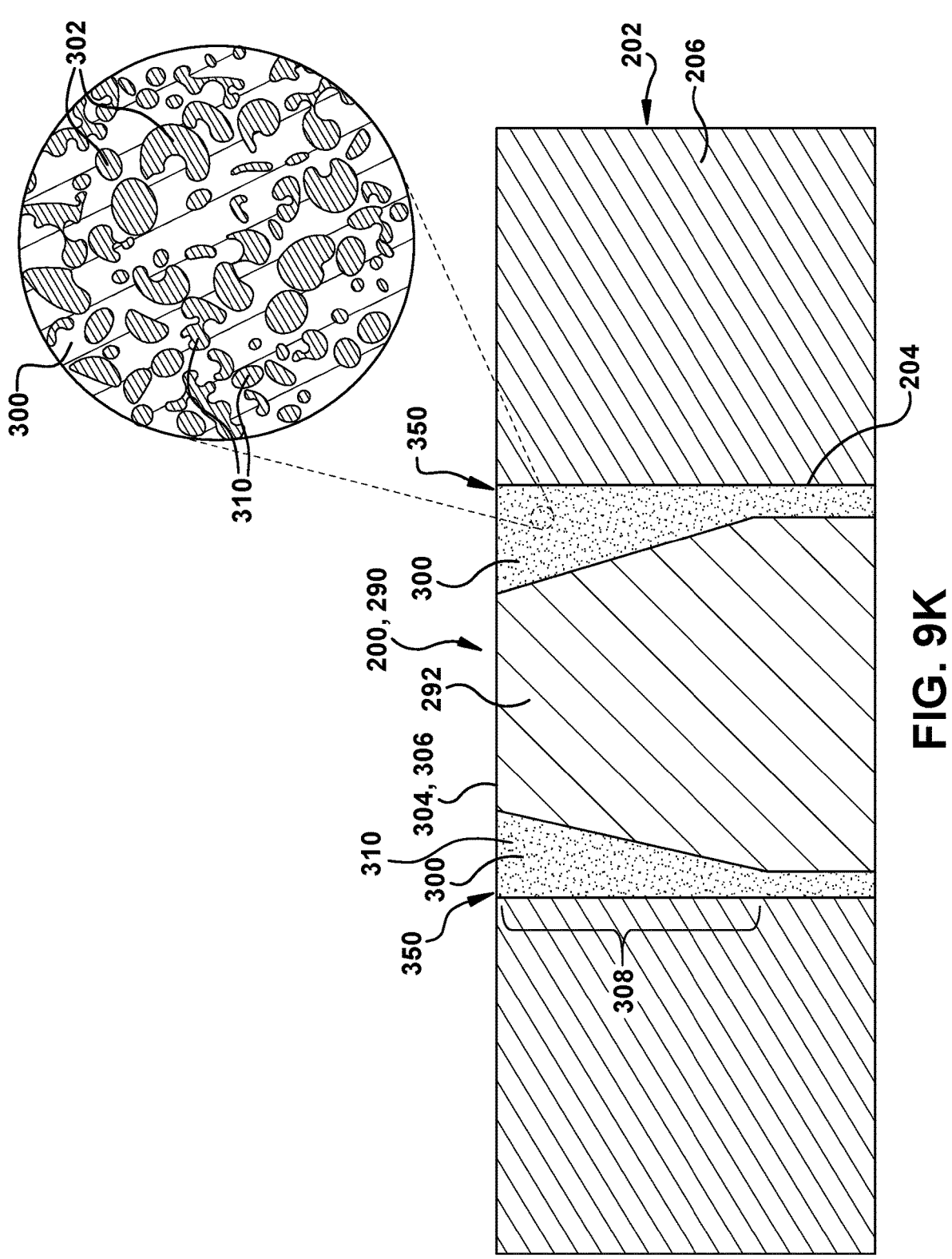
Figure 9L:
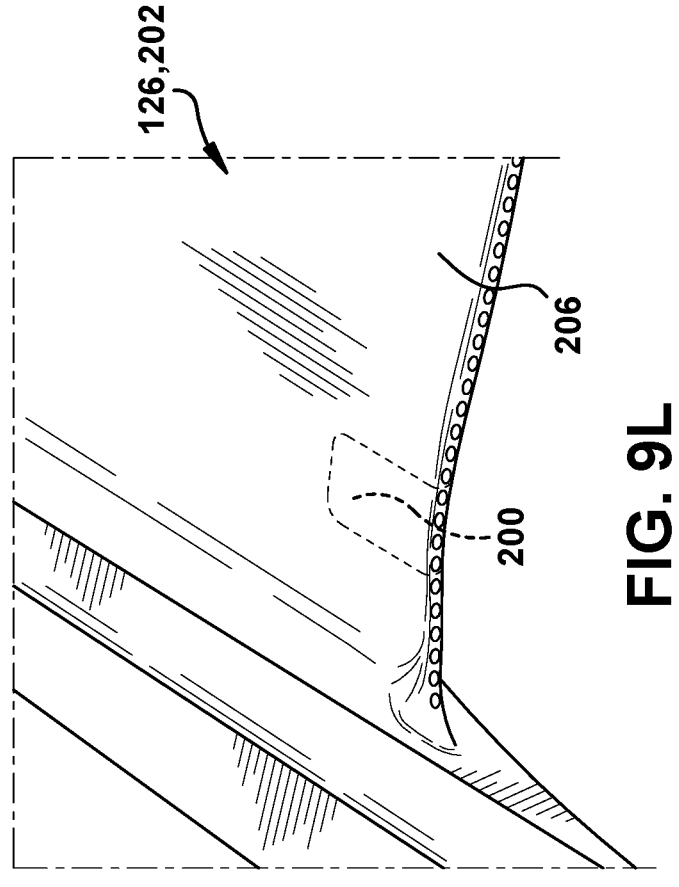

FIGS. 9K-L show illustrative optional finishing steps for component 202, such as but not limited to machining to smooth exterior surfaces and remove excess braze material. As noted, the teachings of the disclosure remove the need for other finishing steps, e.g., peening, heat treatment, hot isostatic pressing (HIP), among others.

Figure 10A:
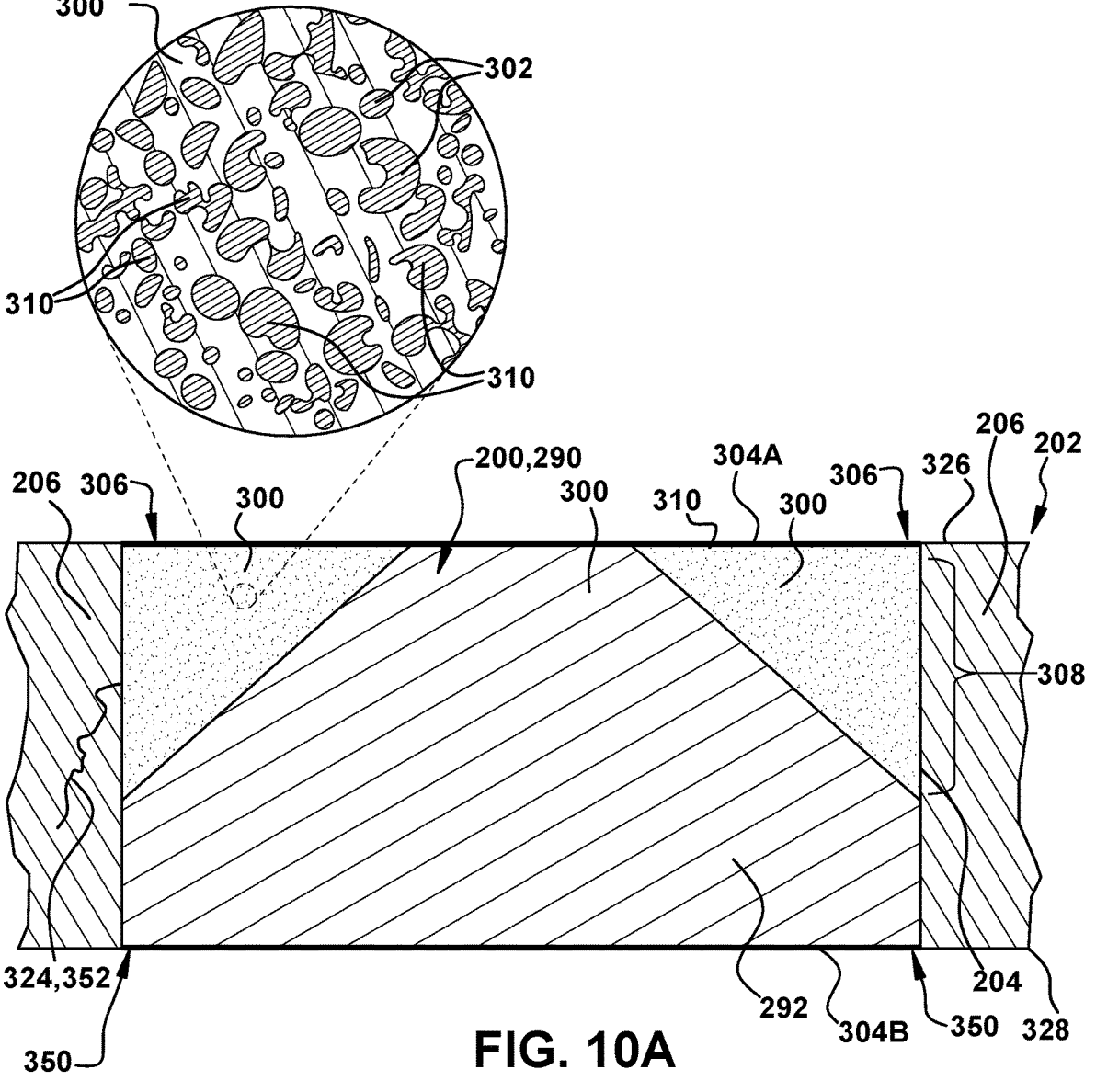
FIGS. 10A-D show enlarged cross-sectional views of a metal coupon in a coupon opening in a body of a component according to embodiments of the disclosure.
Figure 10B:
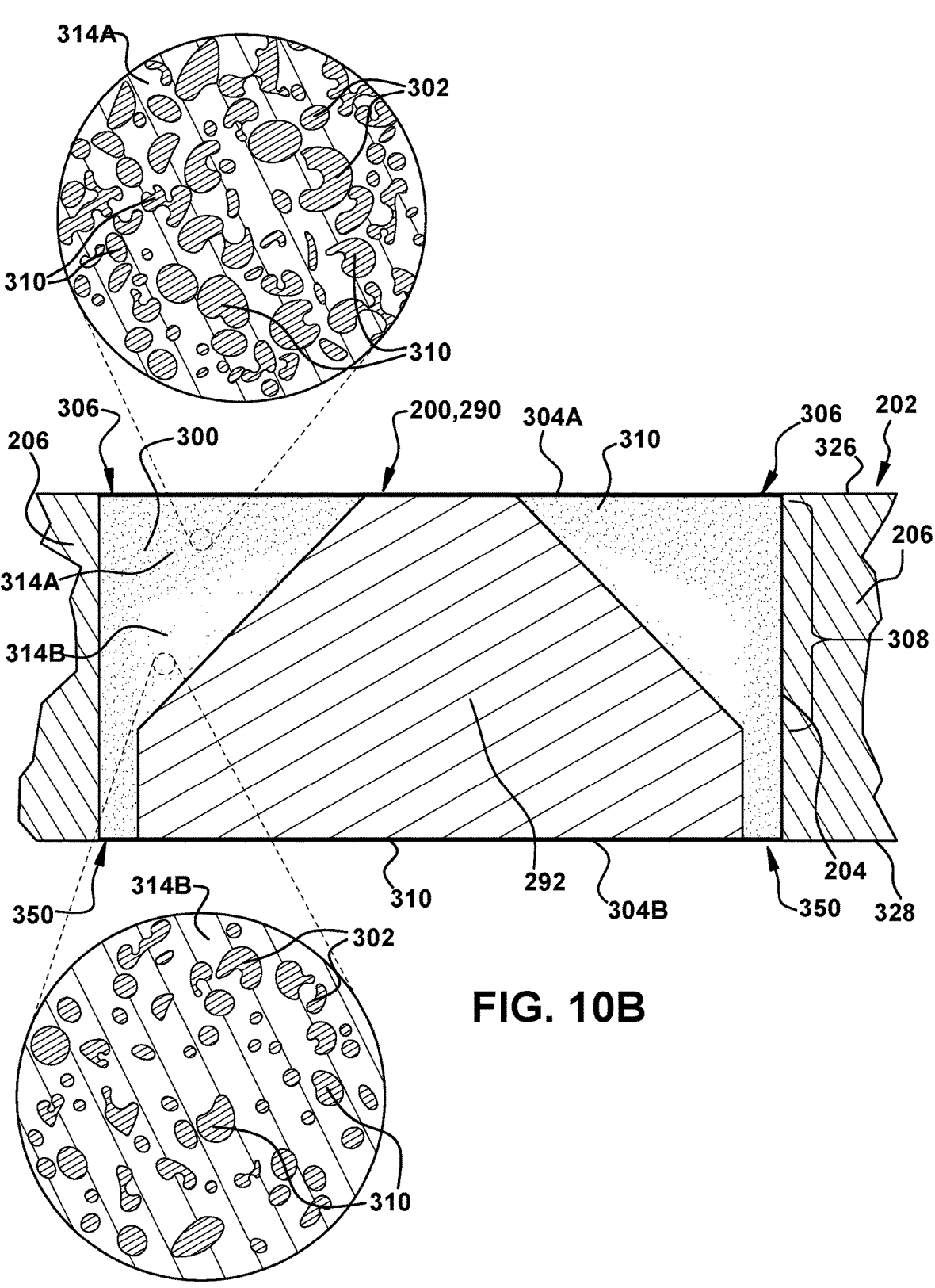
Figure 10C:
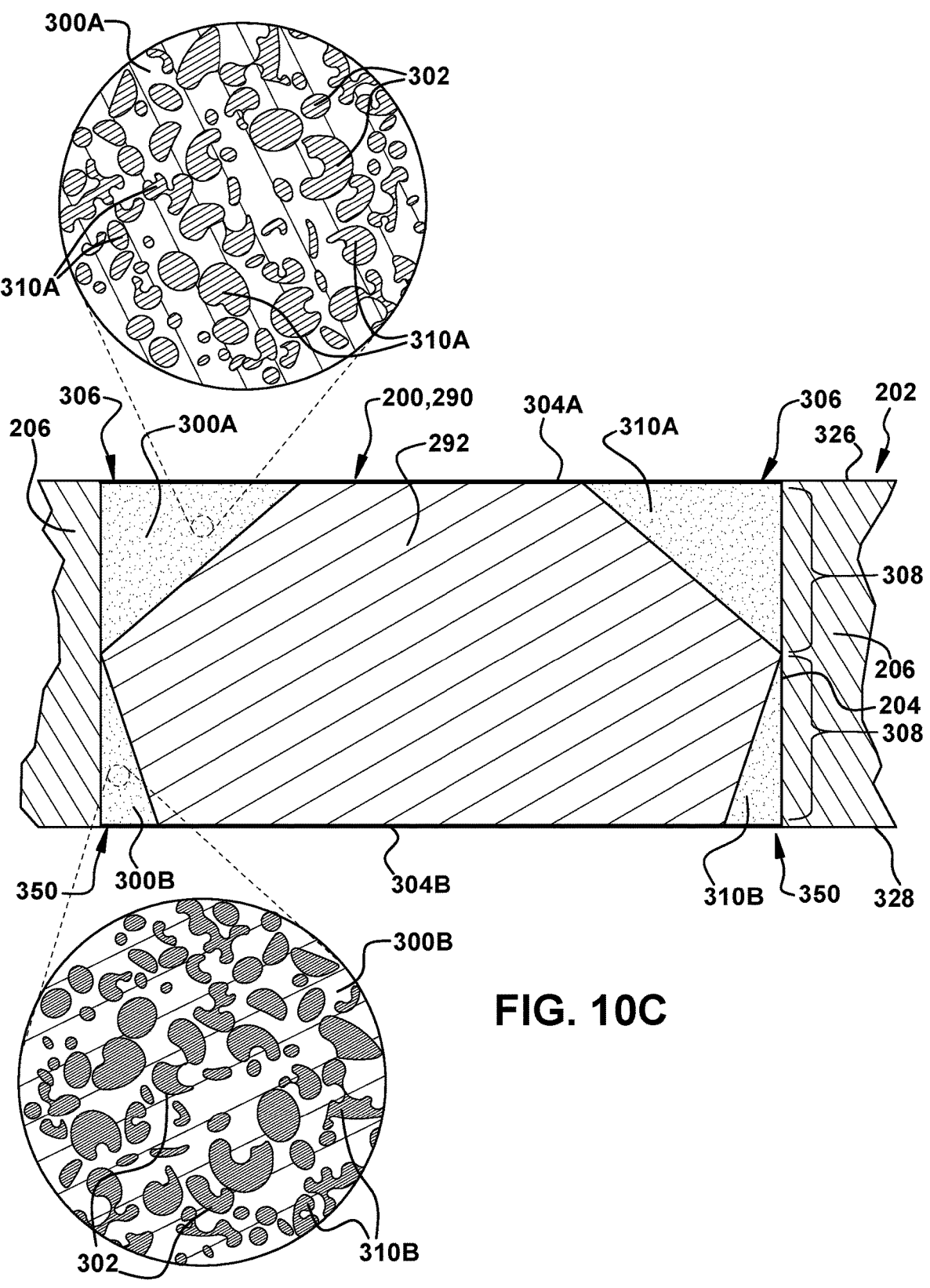
Figure 10D:
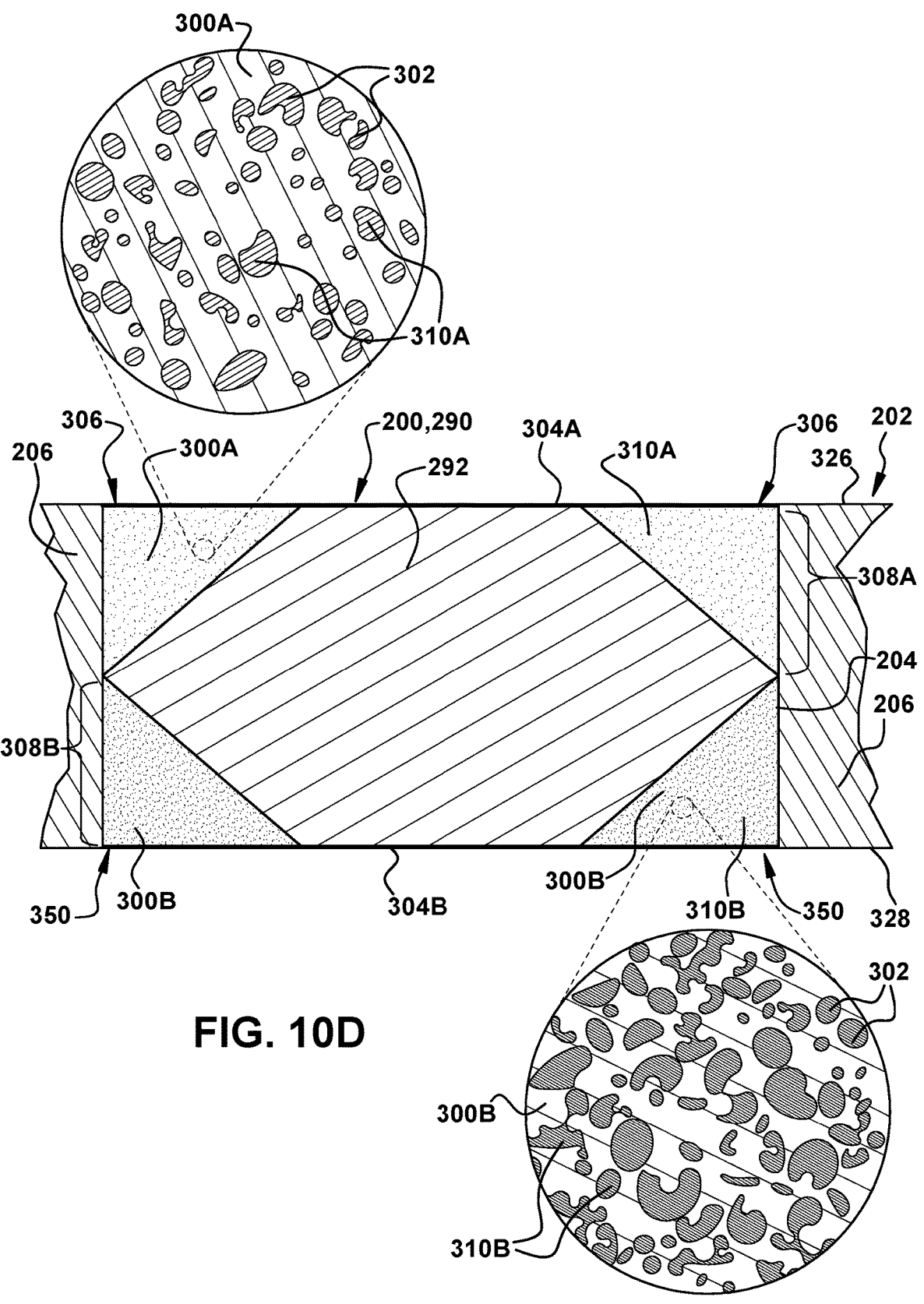

FIGS. 3, 4 and 10A-D show embodiments of component 202 according to embodiments of the disclosure with FIGS. 10A-D showing enlarged cross-sectional views of metal coupon 200 in coupon opening 204 of body 206 of component 202. FIG. 10A shows component 202 with metal coupon 200 according to the FIG. 7B embodiment, FIG. 10B shows component 202 with metal coupon 200 having the FIG. 7A embodiment and variable porosity in porous region 300, FIG. 10C shows component 202 with metal coupon 200 having an arrangement similar to the FIG. 9P embodiment and different braze materials 310A, 310B in porous regions 300A-B having the same porosity, and FIG. 10D shows component 202 with metal coupon 200 having the FIG. 9P embodiment with the porous regions 300A, 300B on different sides 326, 328 of metal coupon 200 having different porosities and different braze materials 310A, 310B therein. Component 202 includes body 206. As noted herein, body 206 can have any form for the particular industrial application in which component 202 is used. In the examples used herein, body 206 may include a turbine rotating blade 132 (FIG. 3) or a turbine stationary nozzle 126 (FIG. 4). While metal coupon 200 is shown in, for example, an airfoil 150, 176 of blade 132 and nozzle 126 in FIGS. 3 and 4, respectively, metal coupon 200 can be in any part of body 206 of component 202. Additively manufactured (AM) metal coupon 200 has dense region 292, porous region(s) 300 and coupon outer surface(s) 304. Braze material 310 couples metal coupon 200 in coupon opening 204 in body 206. As shown in FIGS. 10A-D, braze material 310 includes porous region(s) 300 based at least on a characteristic of the respective porosity. As shown in FIG. 10D, metal coupon 200 may include more than one porous region 300A, B having different porosities. The different porosities may be different in terms of at least one of the following characteristics: percentage of open space volume to total volume, pore shape, pore size, number of pores, and pore connecting passages. Body 206 may have a third porosity different than both the porosities of dense region 292 and porous region(s) 300. For example, body 206 may have a third porosity denser than dense region 292 and porous region(s) 300, e.g., it can be 100% dense (solid). Optionally, metal coupon 200 may include a variable porosity in porous region 300 (shown in FIGS. 7F and 10B). The variable porosity may gradually change porosity between first location 306 and second location(s) 308, e.g., in a stepped or incremental manner.

Braze material(s) 310 infiltrate porous region(s) 300 based at least on a characteristic of the second porosity. "At least on a characteristic" of the porosity indicates the porosity can result in different infiltration characteristics, such as braze material volume, pattern within the porosity, crystallization, chemistry gradients and composition, among other characteristics. However, as understood in the art, other factors can also impact the infiltration characteristics such as the type of braze material and characteristics of the brazing process such as but not limited to: temperature, pressure, positioning of component 202 and metal coupon 200. The consequence of the different porosities is that porous region(s) 300 with braze material(s) 310 therein have at least one different physical characteristic. The porosities can be customized to select those physical characteristics inasmuch as the porosities can impact those physical characteristics. FIG. 10A shows component 202 with metal coupon 200 according to the FIG. 7B embodiment with porous region 300 with a single, uniform porosity and a single braze material 310. In another example, the porosity of porous region 300 may be higher (i.e., less dense) at first location 306 than at any second location 308 within metal coupon 200. FIG. 10B shows porous region 300 with different porosity of sub-regions 314A, 314B, but with the same braze material 310 therein. FIG. 10C shows component 202 with metal coupon 200 with different braze materials 310A, 310B in porous regions 300A-B having the same porosity. In another example, shown in FIG. 10D, porous regions 300A, 300B on opposite sides of metal coupon 200 may have different porosities.

Dense region 292 may also have different shapes on opposing sides of metal coupon 200. In this manner, different sides of metal coupon 200 and component 202 may have different physical characteristics. In terms of airfoils 150, 176 of nozzles 126 or blades 132, a shown in FIGS. 3 and 4, a pressure side outer wall 152, 178 of the airfoil may have different physical characteristics than a suction side outer wall 154, 180 of the airfoil, respectively. Providing different amounts of braze material 310 near a braze joint 350 (FIGS. 10A-D) may strengthen the joint adhesive bond strength of metal coupon 200 in coupon opening 204 in body 206, or it may allow for less oxidation at braze joint 350 or greater thermal conductivity at braze joint 350. Any of the physical characteristics described herein can also be customized based on the different porosities and/or different braze materials. As noted, depending on the braze material 310 used, the different porosities may allow for customization of physical characteristic(s) of component 202, such as: joint adhesive bond strength, stress/strain resistance, ductility, wear resistance, oxidation resistance, thermal conductivity, electrical conductivity, surface roughness, hardness, and/or mass.

In FIG. 10A, component 202 may also include defect coupon opening 352, i.e., a remaining portion 324 (FIGS. 9B-C) of defect 322 (FIG. 9A), in body 206 adjacent coupon opening 204. Here, braze material 310 may also infiltrate at least part of defect coupon opening 352, which acts to stabilize defect coupon opening 352 and prevent it from further propagating in body 206.

As noted, metal coupon 200 may have a near net shape of coupon opening 204 in body 206 of component 202. As shown in FIGS. 7F and 9E, metal coupon 200 may optionally include cooling passage(s) 340 therein. Cooling passage(s) 340 are defined in metal coupon 200 and may extend through external surface 342 (FIG. 9G) of the metal coupon.

While particular locations of different porous regions 300 have been illustrated herein, it is emphasized that the different porous regions can be arranged in any manner to provide different braze material infiltration characteristics and different physical characteristics for component 202.

Embodiments of the disclosure may also include, as shown in FIGS. 1-2, turbomachine 100 including turbine assembly 110, and at least one component 202, as described herein. Component(s) 202 may take the form turbine stationary nozzle(s) 126, turbine rotating blade(s) 132 or other components of turbomachine 100. Metal coupon 200 can be used in a newly manufactured component or in a repaired component.

The disclosure provides various technical and commercial advantages, examples of which are discussed herein. For repairs, additive manufacturing allows cost-effective creation of metal coupons with custom-fitted shapes where only damaged material needs to be removed. Porous region(s) may provide a higher percentage of a base metal alloy (e.g., >60%) in certain areas that may result in improved physical characteristics compared to, e.g., pre-sintered preforms. Porous regions may also provide a welded/fused component matrix (e.g., with a superalloy metal base) with braze material fill which is stronger compared to conventional metal parts surrounded by braze material. Multi-flow paths for the braze material using porous regions may also decrease the likelihood of a lack of fill and/or voids along a brazed joint compared to the conventional narrow gap-filling brazing process. Porous regions can be formed with differences in porosity across metal coupon to allow for highly customized braze material flow. Porous regions also accommodate greater joint gap dimensional variance compared to machined dense coupons with narrow gaps for braze material. Repairs using the teachings of the disclosure are stronger than traditional narrow gap brazing processes, do not require certain post-repair finishing, yet provide improved physical characteristics compared to current techniques, such as pre-sintered preforms (PSPs). The porous and dense regions of the metal coupon deliver the braze material to only the required areas instead of wetting the outside of the joint, which minimizes the required subsequent machining to blend the surfaces.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A component, comprising:
a body having a coupon opening defined therein;
an additively manufactured (AM) metal coupon including
a dense region that has a porosity of less than 1% open space volume to total volume of the dense region such that a braze material cannot infiltrate the dense region, a porous region adjacent the dense region, and a coupon outer surface, wherein the porous region has a first cross-sectional area at a first location at or near the coupon outer surface and a second cross-sectional area less than the first cross-sectional area at a second location distal from the coupon outer surface; and
wherein braze material couples the AM metal coupon in the coupon opening defined in the body, the braze material infiltrated into the porous region.

2. The component of claim 1, wherein the dense region has a third cross-sectional area at the first location and a fourth cross-sectional area greater than the third cross-sectional area at the second location.

3. The component of claim 1, wherein the porous region has a porosity between 2% to 50% open space volume to total volume of the porous region.

4. The component of claim 1, wherein the porous region has a variable porosity having a higher porosity at the first location and a lower porosity towards a bottom of the coupon opening, and wherein the porous region includes more braze material at the first location than at the second location.

5. The component of claim 1, wherein the body is solid material.

6. The component of claim 1, wherein the AM metal coupon has a near net shape of the coupon opening in the body of the component.

7. The component of claim 1, further comprising a defect coupon opening in the body adjacent the coupon opening, wherein the braze material infiltrates at least part of the defect coupon opening.

8. A method of repairing a component having a defect and a component surface, the method comprising:
removing at least part of the defect at the component surface by forming a coupon opening in the component;
additively manufacturing a metal coupon;
positioning the additively manufactured (AM) metal coupon in the coupon opening, the AM metal coupon including a dense region that has a porosity of less than 1% open space volume to total volume of the dense region such that a braze material cannot infiltrate the dense region, a porous region adjacent the dense region, and a coupon outer surface, wherein the porous region has a first cross-sectional area at a first location at or near the coupon outer surface and a second cross-sectional area less than the first cross-sectional area at a second location distal from the coupon outer surface;

positioning the braze material at a junction of the coupon outer surface of the AM metal coupon and the component surface of the component; and infiltrating the braze material into the porous region to couple the AM metal coupon in the coupon opening in the component.

9. The method of claim 8, wherein the additively manufacturing includes forming the dense region with a third cross-sectional area at the first location and a fourth cross-sectional area greater than the third cross-sectional area at the second location.

10. The method of claim 8, wherein, during the infiltrating, the braze material is directed towards an inner surface of the coupon opening through the porous region by at least part of the dense region.

11. The method of claim 8, wherein the porous region includes more braze material at the first location than at the second location.

12. The method of claim 8, wherein the porous region has a variable porosity having a higher porosity at the first location and a lower porosity towards a bottom of the coupon opening, and wherein the porous region includes more braze material at the first location than at the second location.

13. The method of claim 8, wherein the infiltrating includes infiltrating all of the braze material positioned at the junction into the porous region.

14. The method of claim 8, wherein the component and the AM metal coupon include a superalloy material.

15. The method of claim 8, wherein the forming includes forming the coupon opening in the component at the defect and the component surface such that the coupon opening is disposed on either side of the defect.

16. The method of claim 8, wherein the removing includes leaving a remaining portion of the defect and the infiltrating includes infiltrating the braze material into at least part of the remaining portion of the defect.

17. The method of claim 8, wherein the coupon opening defines a first width and the defect defines a second width, wherein the first width is larger than the second width.

18. The method of claim 8, further comprising, after forming the coupon opening:

creating a model of the coupon opening; and additively manufacturing the AM metal coupon based on the model of the coupon opening.

19. The method of claim 18, wherein the additively manufacturing includes manufacturing the metal coupon to a near net shape of the coupon opening based on the model of the coupon opening.

20. The method of claim 8, wherein the metal coupon is additively manufactured by using a laser having one or more melting beams to fuse together layers of the metal powder, and further comprising adjusting a parameter of the laser to control the porosity of the porous region.

21. The method of claim 19, wherein the adjusting a parameter step comprises at least one of:

adjusting an amount of overlap of a melting area of the one or more melting beams;

adjusting scanning speed; and adjusting at least one of melting beam spot size, focus, or power.

* * * * *